US008769079B1

(12) United States Patent
Goswami

(10) Patent No.: US 8,769,079 B1
(45) Date of Patent: Jul. 1, 2014

(54) DETERMINATION AND MANAGEMENT OF CLICK VALUES ASSOCIATED WITH VISITORS TO WEB SITES

(75) Inventor: Bhavesh Goswami, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 319 days.

(21) Appl. No.: 11/767,897

(22) Filed: Jun. 25, 2007

Related U.S. Application Data

(63) Continuation of application No. 11/537,555, filed on Sep. 29, 2006.

(51) Int. Cl.
*G06Q 30/00* (2012.01)

(52) U.S. Cl.
USPC ........... 709/224; 709/223; 705/14.4; 705/37; 705/14.52; 705/14.23; 705/14.46; 705/14.71

(58) Field of Classification Search
USPC ............. 709/224, 223; 705/14, 14.23, 14.41, 705/14.52, 37, 14.4
See application file for complete search history.

(56) References Cited

U.S. PATENT DOCUMENTS

| 6,658,467 | B1* | 12/2003 | Rice et al. ................. 709/224 |
| 6,907,566 | B1 | 6/2005 | McElfresh et al. |
| 6,915,271 | B1 | 7/2005 | Meyer et al. |
| 6,925,442 | B1 | 8/2005 | Shapira et al. |
| 6,976,056 | B1 | 12/2005 | Kumar |
| 2002/0004735 | A1 | 1/2002 | Gross |
| 2002/0004742 | A1 | 1/2002 | Willcocks et al. |
| 2002/0072965 | A1 | 6/2002 | Merriman et al. |
| 2002/0082923 | A1* | 6/2002 | Merriman et al. ............ 705/14 |
| 2002/0091652 | A1* | 7/2002 | Nagahara .................. 705/400 |
| 2002/0099600 | A1 | 7/2002 | Merriman et al. |
| 2002/0116313 | A1 | 8/2002 | Detering |
| 2002/0143630 | A1 | 10/2002 | Steinman et al. |
| 2002/0169760 | A1* | 11/2002 | Cheung et al. .............. 707/3 |
| 2003/0216930 | A1* | 11/2003 | Dunham et al. ............. 705/1 |
| 2004/0044571 | A1* | 3/2004 | Bronnimann et al. ......... 705/14 |
| 2004/0167816 | A1 | 8/2004 | Kamath |
| 2004/0186778 | A1 | 9/2004 | Margiloff et al. |
| 2005/0192863 | A1* | 9/2005 | Mohan ....................... 705/14 |
| 2005/0197164 | A1* | 9/2005 | Chan ......................... 455/566 |
| 2005/0256951 | A1* | 11/2005 | Shapira et al. ............ 709/223 |
| 2006/0173743 | A1 | 8/2006 | Bollay |
| 2006/0212350 | A1* | 9/2006 | Ellis et al. ................. 705/14 |
| 2006/0259359 | A1 | 11/2006 | Gogel |
| 2006/0259360 | A1* | 11/2006 | Flinn et al. ................ 705/14 |
| 2007/0016428 | A1 | 1/2007 | Loveland |
| 2007/0073723 | A1 | 3/2007 | Ramer et al. |

(Continued)

OTHER PUBLICATIONS

"Pay-per-click Advertising Basics"—E Blox, Apr. 2007 http://www.eblox.com/bigaustin/Handout_5_Pay_per_Click.pdf.*
PCT Search Report for PCT Application No. PCT/US 07/79755, mailed Apr. 18, 2008 (3 pages).

(Continued)

*Primary Examiner* — Randy Scott
(74) *Attorney, Agent, or Firm* — Lee & Hayes, PLLC

(57) ABSTRACT

Tools and techniques for determining click values are described herein. A method for determining click values may include processing transaction history records. These records may be related to transactions that are conducted between visitors and a website. The method may also include computing respective click values associated with different visitors, based on the transaction history records involving those visitors. These click values indicate a likelihood that the visitors may transact for particular goods or services offered through the website.

24 Claims, 13 Drawing Sheets

(56) References Cited

U.S. PATENT DOCUMENTS

| | | | |
|---|---|---|---|
| 2007/0106555 A1* | 5/2007 | Benson | 705/14 |
| 2007/0162379 A1* | 7/2007 | Skinner | 705/37 |
| 2007/0179849 A1 | 8/2007 | Jain | |
| 2007/0239517 A1* | 10/2007 | Chung et al. | 705/10 |
| 2007/0244750 A1 | 10/2007 | Grannan et al. | |
| 2008/0082417 A1 | 4/2008 | Publicover | |
| 2008/0306809 A1* | 12/2008 | Kwak et al. | 705/10 |
| 2009/0067599 A1* | 3/2009 | Agarwal et al. | 379/114.21 |

OTHER PUBLICATIONS

Office action for U.S. Appl. No. 11/537,555, mailed on Nov. 7, 2012, Goswami, "Click Value Determination With Incentive Schemes for Website Visitors and Advertisers", 32 pages.

Office Action for U.S. Appl. No. 11/537,555, mailed on May 16, 2013, Goswami, "Click Value Determination With Incentive Schemes for Website Visitors and Advertisers", 32 pages.

Final Office Action for U.S. Appl. No. 11/537,555, mailed on Dec. 16, 2013, Bhavesh Goswami, "Click Value Determination With Incentive Schemes for Website Visitors and Advertisers", 32 pages.

* cited by examiner

DETERMINATION AND MANAGEMENT OF CLICK VALUES ASSOCIATED WITH VISITORS TO WEB SITES

CROSS-REFERENCE TO RELATED APPLICATIONS

This application is a continuation of pending U.S. application Ser. No. 11/537,555, filed on 29 Sep. 2006, entitled "Click Value Determination with Incentive Schemes for Website Visitors and Advertisers". This pending application is incorporated by this reference as if set forth verbatim herein, and the benefit of the filing date of this pending application is claimed to the fullest extent permitted by 35 U.S.C. §120.

BACKGROUND

It has become increasingly common for website operators to collect revenue from advertisers, based on how many times that visitors to the websites click on advertisements presented in connection with the website. In many cases, the websites openly encourage their visitors to click or otherwise responds to the ads presented on behalf of the advertisers, in an effort to increase revenues and profitability. The industry often refers to this website advertising model as the "pay-per-click" model. Under this model, the advertiser pays some amount for each click received from website visitors.

Current implementations of the pay-per-click model may not distinguish between different visitors to the website, in terms of how likely the visitors may be to conduct transactions with the advertisers. For example, well-qualified visitors who are highly likely to purchase goods or services from the advertiser are treated the same as casual visitors who are unlikely to purchase at all. Thus, the advertisers may pay the same amount to receive a click from the well-qualified visitors as they do for clicks from casual visitors. This circumstance may reduce the attractiveness of the pay-per-click model to potential advertisers.

Another concern with conventional pay-per-click models is click fraud, which refers to the practice of artificially and maliciously inflating the number of clicks reported on advertisements presented in connection with websites. Click fraud is an ongoing issue, particularly to advertisers who may be exposed to excessive charges resulting from fraudulently-inflated click counts. If left unchecked over time, click fraud may cause advertisers to reconsider advertising on websites, to the detriment of website operators who may stand to lose this revenue stream from the advertisers.

SUMMARY

Tools and techniques are described herein for determining click values, along with incentive schemes for website visitors and advertisers. These tools may provide a click value server that includes a click value determination unit and an incentive administration unit. The click value determination unit may compute respective click values for different visitors to a website. These click values may indicate a likelihood that the visitors may transact for particular goods or services offered through the website. The incentive administration unit manages visitor incentives provided to the visitors, and also manages advertiser incentives provided to the advertisers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed to tools and techniques related to determination and management of click values associated with visitors to web sites. This description begins with an overview of illustrative operating environments for determining and managing click values associated with visitors to web sites, presented with FIG. 1.

Figure 1:
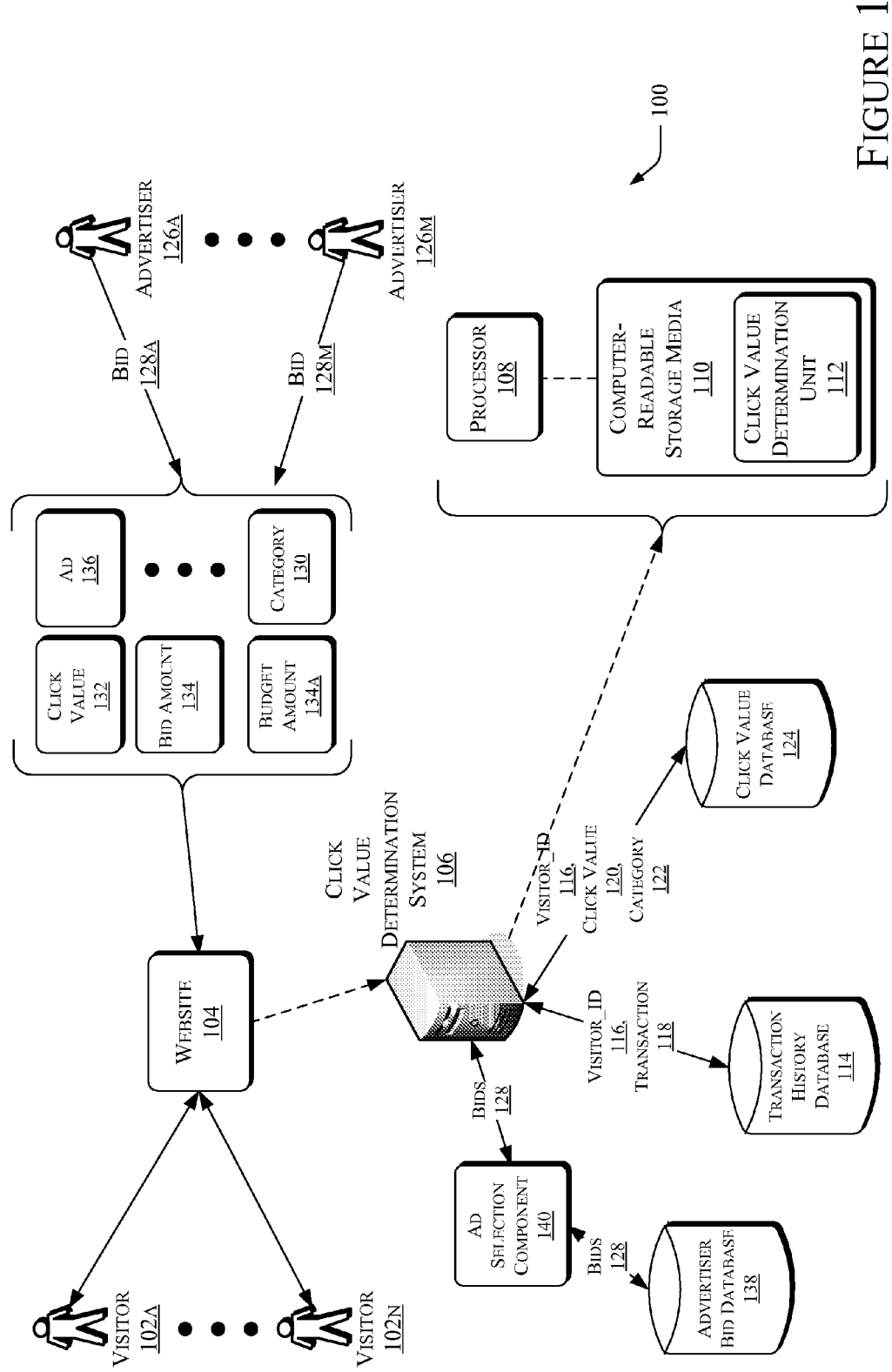
FIG. 1 is a combined block and data flow diagram of an operating environment for determining and managing click values associated with visitors to web sites.

FIG. 1 illustrates components and data flows relating to illustrative operating environments 100 for determining and managing click values associated with visitors 102 to web sites 104. For convenience of illustration and reference only, FIG. 1 shows two visitors 102A and 102N interacting with one website 104, with the interactions being represented by the solid lines connecting the visitors 102 and the website 104. However, the operating environments 100 could support any number of websites, each interacting with any number of visitors. It is noted that the visitors may access the website using respective computing systems loaded with appropriate browser software, and may access the website over a wide-area communications network such as the Internet, but those components are omitted from FIG. 1 in the interests of conciseness.

The term "visitor" relates generally to any person accessing a given website, including, but not limited to, persons wishing to purchase, or actually purchasing goods or services offered through the website. A visitor may also be a person accessing the website to research or inquire about goods or services, or to seek or render opinions relating to those goods or services. Visitors may also access the website to find merchants from whom to obtain goods or services. Those merchants may include a company that operates the website, or third-party merchants affiliated with the website who offer goods and/or services through the website.

It is noted that, in some instances, the website 104 may be a merchant website that offers goods and/or services to the visitors 102. However, in other instances, the website may serve as a conduit for directing the visitors to third-party merchant websites, and not offer goods or services itself. In such instances, the website may be a search engine, a site where visitors may submit opinions or reviews, or the like.

The website 104 may be implemented to include a click value server 106. For purposes of illustration and description herein, the click value server 106 may perform various functions relating to determining and managing click values associated with visitors to web sites on behalf of the website. Additionally, while FIG. 1 shows one click value server for convenience, it is noted that the functions attributed to the click value server, as described herein, may be distributed across any number of physical machines.

The click value server 106 may include one or more processors 108 that communicate with one or more instances of computer-readable storage media 110. The processors may read data from or write data to portions of the computer-readable storage media in performing any of the functions described herein. Additionally, the computer-readable storage media may contain software instructions that, when loaded into the processors, cause the click value server to perform any of the functions described herein. For example, the storage media may contain one or more software modules that define a click value determination unit 112, which represents a software-based implementation of suitable instructions for determining and managing click values associated with visitors to web sites.

The click value server 106 may interact with one or more data stores or data bases in determining and managing click values associated with visitors to web sites. For convenience of description only, these data stores are shown as different databases in FIG. 1. However, it is noted that these data stores could be combined for ease of implementation, or distributed across multiple physical machines.

A transaction history database 114 contains records for previous interactions conducted between the website 104 and the visitors 102. In overview, the click value server may process the records in the transaction history database to compute a click value for the visitors. More specifically, the click value server may obtain respective unique identifiers (IDs) associated with the visitors, denoted generally as visitor IDs 116. These visitor IDs 116 may include, for example, customer names, telephone numbers, email addresses, customer numbers, or any other suitable unique identifier. More specifically, in one embodiment, a given visitor 102 may be associated with one or more visitor IDs 116. For example, a given visitor may have multiple accounts with a given website.

It is noted that, in some instances, the click value determination system may not access a transaction history database to compute the click values. In but one possible scenario, a transaction history database may not be available because the website 104 is new and does not yet have an established customer base. In such instances, the click value determination system may assign default click values to all visitors 102, and update these click values as visitors transact with the website over time. This initial default click value may be any convenient value, for example, zero.

Additionally, the click value server may process a plurality of different transaction records, denoted generally at 118. Transactions refer generally to any interaction between a visitor and the website relating to goods or services related to the website, including, for example only, purchases, inquiries, searches, accesses to opinions or reviews, or the like.

To facilitate subsequent processing, the click value server 106 may divide the transaction records 118 into a plurality of categories. For example, assume that the website 104 offers goods and/or services relating to books, media, apparel, tools, sporting goods, or the like. The click value server may then relate the transaction records 118 into different categories corresponding to these different types of goods and/or services. Further, the click value server may determine how interested the different visitors have been in these different types of goods and/or services, based on analysis of the previous transaction records 118.

This analysis by the click value server may reveal particular areas of interest for different visitors 102. For example, prior transaction history may indicate that the visitor 102A has frequently and recently purchased golf equipment, but that the visitor 102N is more of a casual visitor who "surfs" the website 104 looking for ancillary subject matter (e.g., pictures, video, or other content), but rarely purchases anything.

For the various visitor identifiers 116, the click value server 106 may define corresponding click value parameters 120 associated with the visitors 102. Further, the click value server may relate these click values 120 to the different categories or sub-categories of goods or services offered through the website 104. For convenience, these categories or sub-categories are denoted generally at 122. FIG. 1 illustrates categories for convenience only, but sub-categories are described in further detail below.

For a given visitor ID 116 and category 122, the click values 120 may indicate the likelihood of the visitor 102 purchasing an item in the category. The click values 120 may be implemented as integers falling within some range of values, for example 1 through 5, with 1 indicating a relatively low likelihood of purchase, and 5 indicating a relatively high likelihood of purchase. However, other specific implementations of the click values are possible, without departing from the spirit and scope of the description herein. In any event, the click value server 106 may store the visitor IDs 116, click values 120, and related categories 122 in a click value database 124.

FIG. 1 shows a plurality of advertisers 126 who may be interested in advertising on the website 104, in hopes of inducing the visitors 102 to purchase goods or services from the advertisers. For convenience only, FIG. 1 shows two advertisers 126A and 126M, but the operating environments may support any number of advertisers. These advertisers may submit respective bids 128A and 128M (collectively, bids 128) to the web site. These bids may include at least various components, as shown in FIG. 1. For example, a given bid 128 may specify a particular category or sub-category 130 of goods or services, whether that category relates to goods or services offered by the advertiser or by the website.

As noted above, the website may or may not offer goods or services to the visitors. In some instances, where the website offers goods or services to the visitors, the categories and/or sub-categories may be organized according to the goods or services offered by the website. However, in other instances, where the website does not offer goods or services, the categories and/or sub-categories may be organized according to what the advertisers 126 offer, or may be organized according to a general scheme employed across several advertisers.

The bid 128 may also specify a click value 132 targeted by the bid. In this manner, the advertisers may target a particular type of visitors (e.g., serious, casual, or somewhere between). The bid 128 may specify a bid amount 134, which indicates the amount of money that the advertiser is offering to pay to present an advertisement to visitors having the click value 132 in the category 130. In addition, the bid may specify a budget amount 134A, which may indicate how much the advertiser 126 wishes to expend on advertising over some period of time (e.g., per minute, hour, day, or the like).

The click value 132 of a visitor in a given category or sub-category may represent the perceived business value of the visitor in that given category or sub-category. As such, the click value may reflect different factors relating to visitors, such as the likelihood that the visitor may purchase or otherwise obtain goods and/or services from the website or from advertisers. The visitor's click value may also reflect the amount of time that the visitor may be expected to spend perusing one or more given websites. In other example, the visitor's click value may reflect the amount of money that the visitor is projected or expected to spend on particular categories of items. In other example, the visitor's click value may reflect the number of page hits or clicks expected from the visitor, when interacting with particular websites.

It is noted that the foregoing examples of factors reflected in click values are provided only for illustration, but not for limitation. Implementations of the description herein may ascribe other meanings to click values without departing from the scope or spirit of the subject matter described herein.

The foregoing structure or model of the bids 128 may enable the advertisers 126 to finely tailor or target their advertisements to particular types of website visitors. For example, assume that the advertiser 126A is a sporting goods retailer featuring a particularly strong lineup of golfing equipment. This advertiser 126A may be willing to pay a premium to have its ad 136 reach well-qualified and interested golfing enthusiasts, such as the visitor 102A. If so, the advertiser 126A may, in its bid 128A, specify a relatively high click value 132 in the category 130 of sporting goods, or in the sub-category of golfing equipment.

It is noted that the advertisers 126 may take different forms, in different possible implementations. Moreover, these advertisers may have different goals or objectives for their advertising efforts. For example, the advertisers include online merchants who wish to increase sales. The advertisers may include news-oriented or review/opinion-oriented sites, and may wish to increase page hits or eyeball time. The advertisers may also include search engines who wish to attract visitors to increase search counts and advertising revenue.

In another example, assume that the advertiser 126M wishes to target a broad audience of visitors, without regard to particular areas of interest or "seriousness", and has structured its advertising budget accordingly. In this scenario, the bid 128M from the advertiser 126M may specify a relatively low bid amount 134, as compared to the bid amount from the advertiser 126A. Further, the bid 128M may not specify a category 130 at all, and may either specify a low click value 132, or no click value at all.

It is noted that the bids 128 may specify a range of click values 132, or may leave the click values empty or blank to have the bid apply to any click value. Additionally, the bids 128 may specify one or more categories 130, or may leave the categories empty or blank to have the bid apply to any category.

Figure 4:
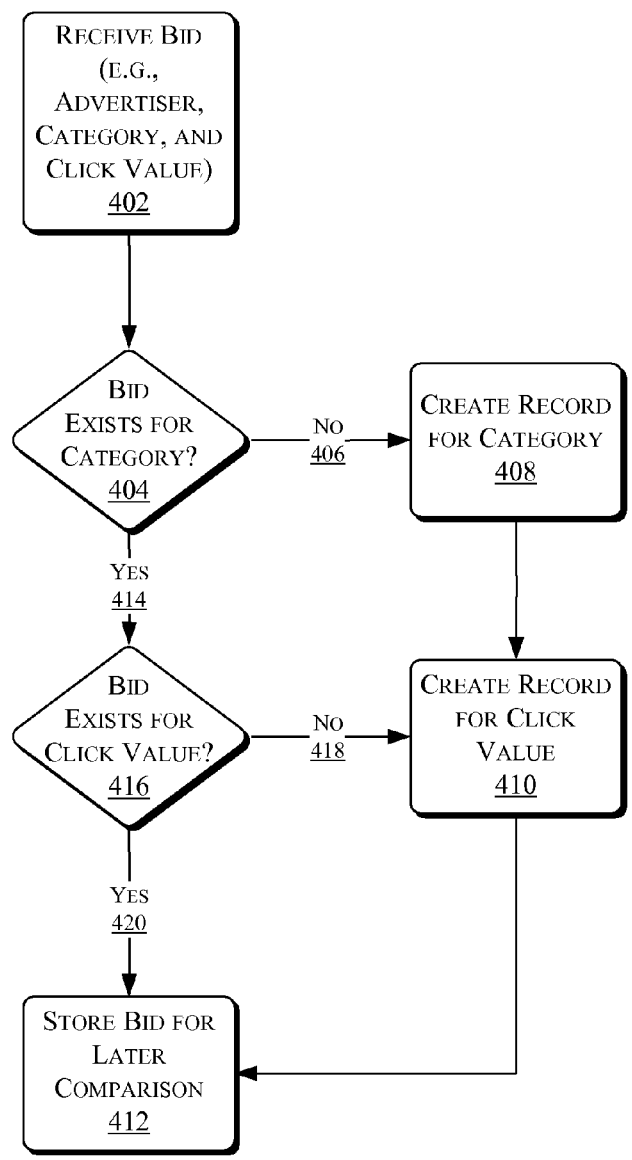
FIG. 4 is a flow diagram of a process for populating a bid value database, for use with determining and managing click values associated with visitors to web sites.
Figure 5:
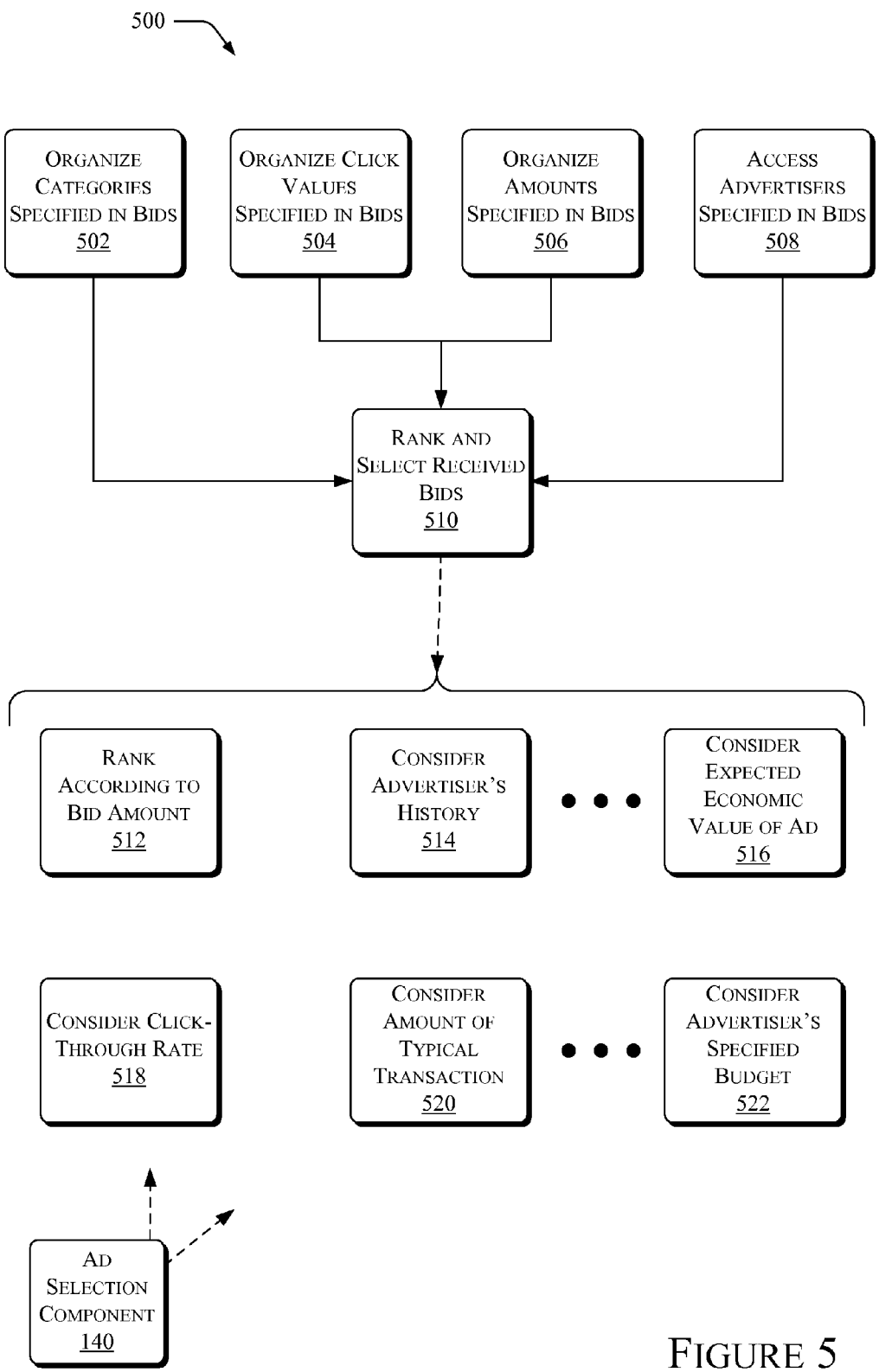
FIG. 5 is a flow diagram of a process for processing the bid value database and for selecting and ranking the bids.

The click value server may receive the bids 128, and store them in an advertiser bid database 138 for later evaluation and processing. An advertisement selection component 140 may serve as an intermediary between the click value server 106 and the advertiser bid database 138. The advertisement selection component 140 may be implemented as a software component on the computer-readable media 110, or it may reside on a server other than the click value server 106. FIGS. 4 and 5 below provide further details on this processing.

Figure 2:
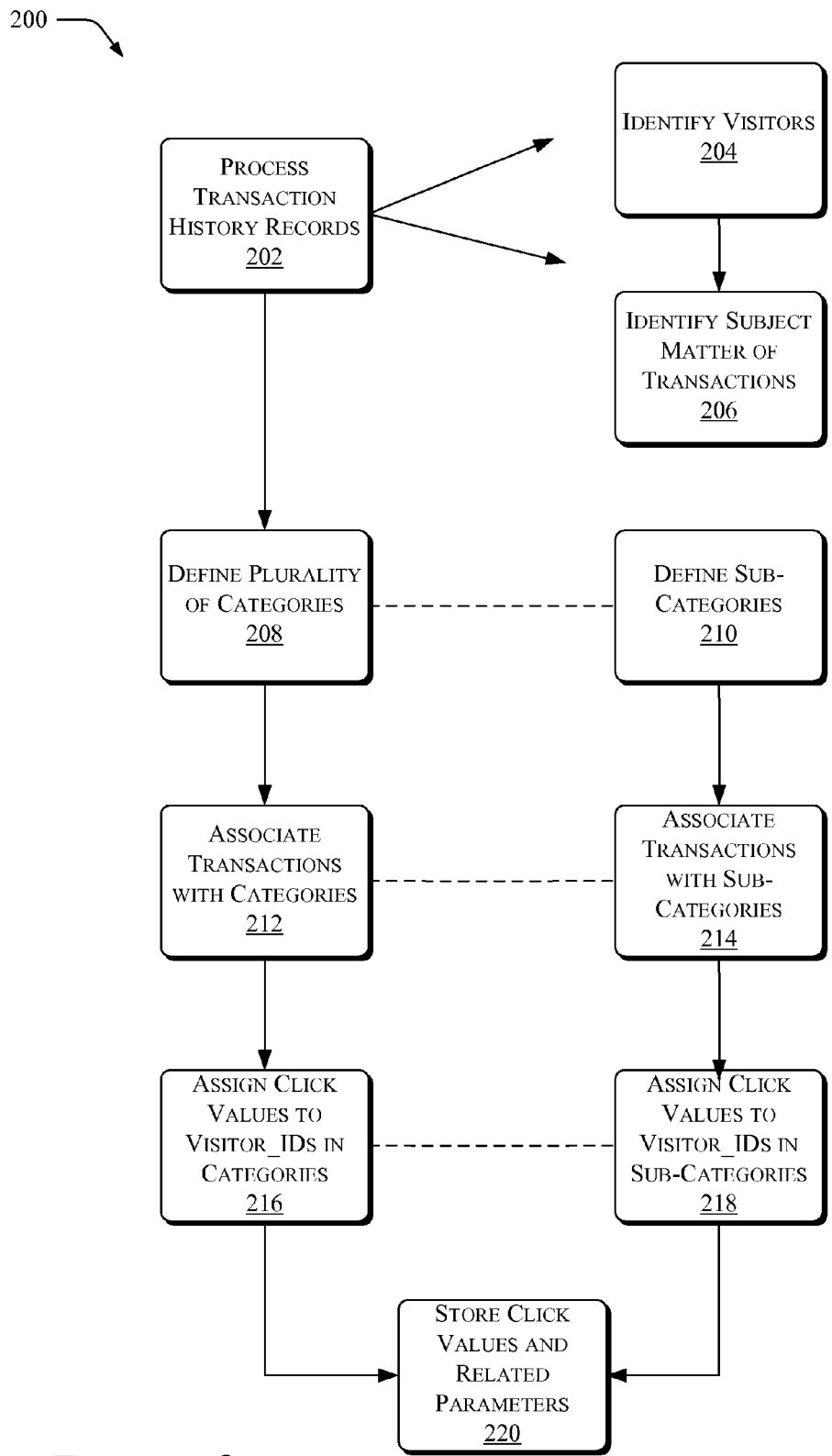
FIG. 2 is a flow diagram of a process for populating a click value database, for use with determining and managing click values associated with visitors to web sites.

Having described the operating environments 100 in FIG. 1, the discussion proceeds now to a description of a process flow for populating the click value database 124, now presented with FIG. 2.

FIG. 2 illustrates a process flow 200 for populating a click value database, such as the click value database 124 shown in FIG. 1. Before beginning the detailed description of FIG. 2, it is noted that FIG. 2 and other flow charts or diagrams included herein refer to certain components of the operating environments 100 only for convenience in describing examples of possible implementations. However, aspects of the process flows may be implemented with other components from other operating environments without departing from the scope and spirit of the description herein. Additionally, it is noted that FIG. 2, and other flow charts or diagrams included herein, present processing blocks in the orders shown only for convenience of discussion, but not to limit possible implementations. Finally, it is noted that implementations of these process flows may include some or all of the processing shown in these flowcharts, and that these process flows may be implemented in the context of processing not shown in these flowcharts.

Block 202 represents processing transaction history records associated with a website, such as the transaction records 118 shown in FIG. 1. FIG. 1 shows an example website at 104. As part of processing the transaction history records, block 202 may include obtaining a plurality of the transaction records from a data store, such as the transaction history database 114, also shown in FIG. 1. Block 202 may include identifying a plurality of visitors (e.g., 102) whose interactions are represented in the transaction history records, as denoted in block 204. Block 202 may also include identifying the subject matter involved in a plurality of the different transaction history records, as denoted in block 206.

Block 208 represents defining a plurality of categories into which the subject matter of the various transaction history records may be organized. As such, block 208 may utilize the results of the subject matter identification process represented in block 206. In this manner, block 208 may include defining categories into which the goods and/or services offered by the website may fall. FIG. 1 denotes examples of such categories at 122.

In addition, block 208 may include defining one or more sub-categories for at least some of the categories. Thus, FIG. 2 includes block 210 to represent defining these sub-categories. Assume, for example, that a website offers books in a wide variety of categories, such as history, fiction, classic literature, self-improvement, and the like. Within the history category, a plurality of sub-categories may be defined for World War I, World War II, and the like. Additionally, further subdivisions of the sub-categories may be defined. For example, the World War II sub-category may be further subdivided into the European theater of operations, the Pacific theater of operations, the North African theater of operations, and the like.

Block 212 represents associating transactions with particular categories. Put differently, block 212 may include assigning the subject matter of various transactions with the categories. For example, assume that the visitor 102A has purchased or researched numerous golf clubs and history books through the website 104. In this case, block 212 may organize these transactions, such that the golf club transactions are associated with, for example, a sporting goods category, or a golfing sub-category. Block 212 may also associate the history book transactions associated with, for example, a book category, or a military history book sub-category. FIG. 2 include block 214 to represent associated transactions with one or more sub-categories or further sub-divisions.

Block 216 represents assigning click values to respective visitor identifiers (i.e., visitor IDs) in particular categories, while block 218 represents assigning click values to respective visitor identifiers (i.e., visitor IDs) in particular sub-categories. In either case, this assignment process may include, for example, determining how many purchases a given visitor has made in some category. These purchases may be aggregated over some period of time, and statistically analyzed. For example, this number of purchases may be compared to a median or mean number of purchases made by other visitors. This comparison may facilitate defining the given visitor's click value.

It is noted that when a visitor purchases goods or services in one category, this purchase may enable the process flow 200 to project a click value not only in that one category, but also in one or more other categories as well. For example, assume that a visitor purchases a book pertaining to decision trees. This purchase of a book may result in the visitor increasing his or her click value in the book category. However, the subject matter of the book itself may indicate other areas of interest to the visitor, and may support increasing the visitor's click value in other categories relating to such areas of interest. In this example, the visitor's click value may be increased not only in books, but also in software related fields, such as decision trees or artificial intelligence.

In possible implementations, for those visitors whose number of purchases is near this median or mean number of purchases, block 216 may assign a click value falling in the approximate middle of a range of possible click values. For those visitors whose number of purchases are greater than one standard deviation above this median or mean number of purchases, block 216 may assign a click value at the upper extent of the range of possible click values. Finally, for those visitors whose number of purchases are less than one standard deviation below this median or mean number of purchases, block 216 may assign a click value at the lower extent of the range of possible click values.

In many instances, the goods and/or services offered through the website may be modeled using a tree-like data structure. The website's homepage may serve as the top-most node in this tree, and the top-level, broadest categories may serve as the next lower level of branches or nodes. Within this next lower level of nodes, any sub-categories under the categories may be modeled as further branches or nodes associated with the upper-level nodes, and so on. When a given category or sub-category has no more sub-divisions under it, this category or sub-category may be modeled as a leaf node.

Where the tree structure is useful in modeling the website, the process of assigning click values may include traversing the tree structure. For example, this process may start at the leaf nodes, and, for the various visitors for whom records exist, count how many times the visitors have purchase any goods or services represented by the leaf nodes. Afterwards, this process may advance up the tree structure to the branch nodes, and accumulate all purchases associated with the leaf nodes or any branch nodes that are under the branch nodes. This process may be repeated until it reaches the top-most node. In this manner, the process may define click values with, potentially, the same level of granularity as is exhibited by the website itself.

In providing the foregoing examples of assigning click values, the description herein does not limit possible implementations. For example, the visitors' click values may be calculated based on the visit and/or purchase history associated with the visitors. More specifically, a visitor's more recent history, as compared to older history, may influence the visitor's click value. A visitor who has purchased more items more recently may receive a higher click value than a visitor who has not purchased lately. Similarly, if a given visitor has recently begun spending a lot of time clicking through or looking at, for example, a web page relating to golfing equipment, this may indicate that the visitor is interested in this equipment, is actively researching this equipment, and may be buying soon. Accordingly, this visit time may increase the visitor's click value, at least as relating to the golfing equipment.

Block 220 represents storing the click values, related visitor IDs, and categories/sub-categories in a data store, such as the click value database 124 shown in FIG. 1. Examples of the click values, and related visitor IDs, and categories/sub-categories are shown in FIG. 1 at 120, 116, and 122, respectively.

Figure 3:
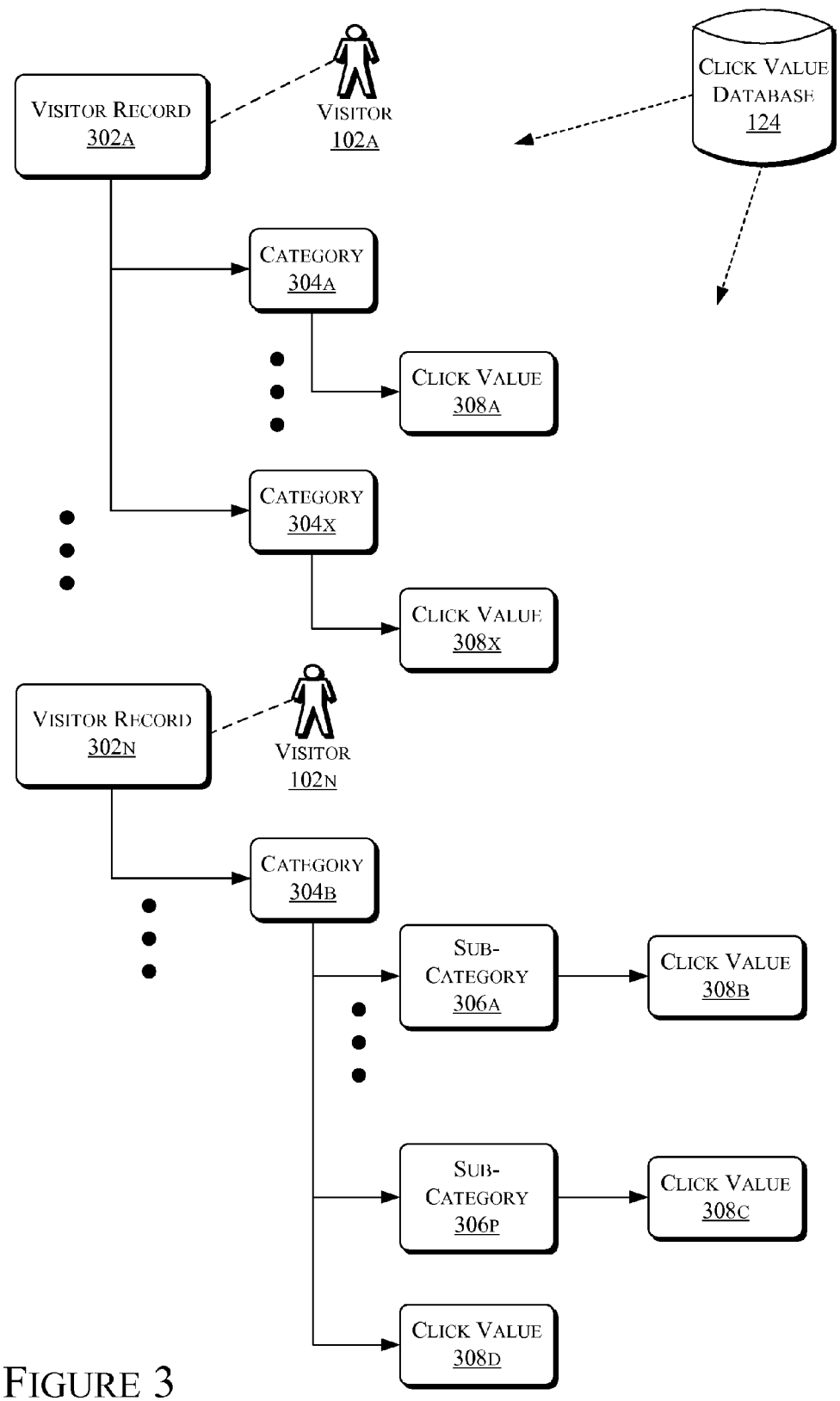
FIG. 3 is a block diagram of the click value database.

Having described the process flow 200 in FIG. 2, the discussion proceeds to a more detailed description of an illustrative structure of the click value database, now presented with FIG. 3.

FIG. 3 illustrates, in block form, an illustrative data structure for a click value database, such as the click value database 124 shown in FIG. 1. The click value database may include a plurality of records 302, with respective ones of the records corresponding to different visitors. FIG. 3 shows two visitor records 302A and 302N (collectively, visitor records 302), associated respectively with the visitors 102A and 102N shown in FIG. 1, as indicated by the dashed lines appearing in FIG. 3.

The visitor records 302 may be associated with one or more category records 304. The category records may correspond to different categories of goods and/or services offered through a website, such as the website 104 shown in FIG. 1. The categories may also correspond to different goods or services offered by advertisers presenting advertisements on the website, such as the advertisers 126 shown in FIG. 1. FIG. 3 shows a visitor record 302A associated with a category record 304A and at least a second category record 304X, while visitor record 302N is associated with at least a category record 304B. In general, implementations of the click value database may include any number of categories, depending on different organizational schemes.

Turning to the visitor record 302N and the category record 304B in more detail, the category record 304B may be associated with one or more instances of sub-category records 306. For example only, FIG. 3 shows an implementation in which the category record 304B is associated with two sub-categories, denoted at 306A and 306P. However, it is noted that the click value database could support any number of sub-categories and other sub-divisions of categories or sub-categories.

In turn, the category records 304 or the sub-category records 306 may be associated with respective click value fields 308. These click value fields may store the click values 120 computed by the click value server 106, as shown above in FIGS. 1 and 2. For example only, FIG. 3 shows a click value field 308A associated with category field 304A. Thus, the click value that was computed for the visitor 102A in the category field 304A may be stored in the field 308A. Likewise, FIG. 3 shows a click value field 308X associated with category field 304X, so that the click value that was computed for the visitor 102A in the category field 304X may be stored in the field 308X. FIG. 3 also shows a click value field 308B associated with the sub-category field 306A, with the contents of the click value field 308B indicating the click value of the visitor 102N within the category 304B and the sub-category 306A. Finally, FIG. 3 shows a click value field 308C associated with the sub-category field 306C, with the contents of the click value field 308C indicating the click value of the visitor 102N within the category 304B and the sub-category 306P.

Returning to the category 304B, this category may also be associated with a click value, represented at block 308D. As noted above the sub-categories 306A and 306P may be associated with respective click values 308B and 308C, which specify the visitor's click value in those different sub-categories. However, the click value 308D indicates the visitor's click value in the overall category 304B.

Having described the above illustrative structure for the click value database, the discussion proceeds to a more detailed description of a process for populating a bid value database, now presented with FIG. 4.

FIG. 4 illustrates a process flow 400 for populating and updating a bid database, such as the advertiser bid database 138 shown in FIG. 1. The process flow 400 may be performed, at least in part, when an operating environment, such as that shown at 100 in FIG. 1, initially starts up, or afterwards when new bids (e.g., 128) arrive from the advertisers. The process flow 400 may be performed by, for example, a click value server (e.g., 106) or similar component. As shown in FIG. 1, the bids may pass through the ad selection component 140 when they are stored in or retrieved from the advertiser bid database.

Block 402 represents receiving at least one bid from an advertiser. FIG. 1 shows an example bid at 128, and an example advertiser at 126. The bid may specify, for example, one or more categories or sub-categories to which the bid applies. The bid may also specify a click value to which that bid applies, as well as the advertiser who is submitting the bid. Only for clarity of illustration, block 402 includes the elements as shown in FIG. 4, but this illustration does not limit the elements that the bid may contain in implementations. It is noted that a given bid may specify multiple categories, with different click values applicable to different categories. For example, a given advertiser may wish to seek more "serious" website visitors in one category (and pay accordingly), while in another category, the advertiser may be satisfied with reaching more casual web site visitors.

Decision block 404 represents determining whether a bid in, for example, the advertiser bid database (e.g., 138) already exists for the category or sub-category specified in the incoming bid. If not, then the process flow 400 takes No branch 406 to block 408, which represents creating a new record for bids related to the category or sub-category specified in the incoming bid.

The process flow then proceeds to block 410, which represents creating a new record to store the click value specified in the incoming bid. As described above, the bid may associate a specified click value with one or more a categories or sub-categories. Block 410 may include associating the new record created for storing the category specified in the bid with the new record for storing the click value specified in the bid.

Assume that the process flow takes the No branch 406 from block 404, and afterwards creates new records for the category and associated click value specified in the bid. In this case, the current incoming bid may be selected for presentation by default, because there are no previous competing bids for the specified category and click value. In this scenario, the advertiser submitting the current bid will have its advertisement presented to any visitors to the website who have the specified click value in the specified category. Accordingly, the process flow 410 may proceed next to block 412, which represents storing the bid for comparison to other bids that may arrive later, as described in more detail in FIG. 5.

Returning to decision block 404, if one or more bids already exist for the category or sub-category specified in the bid, then the process flow may take Yes branch 414 to decision block 416. Taking the Yes branch 414 indicates that at least one previous bid has been received that specifies the same category as the bid received in block 402.

The decision block 416 may evaluate whether a bid already exists for the click value specified in the bid. If no bid exists for the click value in the context of the specified category, then the process flow 400 may take No branch 418 to block 410, which was described above. Taking the No branch 420 from block 416 indicates that the bid received in block 402 is, by default, the selected bid for the specified category and click value. Thus, the process flow would perform blocks 410 and 412, as described above.

From block 416, if a record exists for the specified click value and category, then the process flow 400 takes Yes branch 420 to block 412. Taking Yes branch 420 from block 416 indicates that at least one previous bid has been granted for the click value and category as specified in the bid received in block 402. Thus, the received bid will, in some sense, compete against at least one previous bid, as described in further detail in FIG. 5. In this event, the newly-received bid is stored for later comparison, as represented in block 412.

Having described the process flow 400 for populating the advertiser bid database, the discussion now turns to a description of a process for selecting bids from the bid database for presentation to visitors, now presented with FIG. 5.

FIG. 5 illustrates a process flow 500 for processing the advertiser bid database, and for selecting and ranking the bids for presentation to visitors. In describing FIGS. 4 and 5, it is noted that the process flow 500 may be performed at any time after performing the process flow 400. In some implementations, at least part of the process flow 500 may be performed after a given bid arrives from an advertiser and has been stored. In this manner, these implementations may compare the newly-arrived bid to one or more previous-received bids. In other implementations, at least part of the process flow 500 may be performed after a plurality of new bids have arrived and been stored. In this manner, these implementations may compare several newly-arrived bids to one or more previous-received bids.

It is also noted that the process flow 500 may be performed at any suitable time interval, to select advertisements for placement whenever appropriate. For example, the process flow 500 may be performed once a day, or multiple times a day as conditions change during business operations. Additionally, taken as a whole, the various blocks shown in FIG. 5 may implement a component or system for selecting advertisements. FIG. 1 shows an example of such a component or system at 140. This advertisement selection component 140 is described further in connection with FIG. 7.

Block 502 represents accessing the category values specified in the various bids. Block 502 may include retrieving the bids from a data store, such as, for example, the bid database 138. More specifically, block 502 may include determining the categories for which bids have been received, and may include sorting or otherwise organizing these categories for later comparison. Additionally, block 502 may include representing these bids in appropriate data structures to facilitate the processing shown in FIG. 5.

In a non-limiting example, after some number of bids are received and stored in the bid database, there may be one or more bids pending for an apparel category, a sporting goods category, or the like. Block 502 may include accessing the bids, and grouping them by category.

Block 504 represents accessing the click values specified in the various bids. Block 504 may include retrieving the click values from the bids as stored in, for example, the bid database 138. Block 504 may include sorting or otherwise organizing these click values for later comparison, as well as associating the click values with the categories specified in the bids.

Continuing the example above, within each of the various categories (e.g., apparel, sporting goods, or the like), block 504 may include organizing the click values specified by different bids referencing these categories. For example, within the sporting goods category, one bid may specify a visitor click value of three (3), while two other bids specify a visitor click value of five (5).

Block 506 represents accessing the bid amounts specified by various different bids. For example, assuming that the bids have been organized by categories (block 502) and by specified click values (block 504), then block 506 may include organizing the bids by specified bid amount.

Continuing the example above, within the sporting goods category, the two bids that specify a visitor click value of five (5) may be viewed as competing bids, since they reference the same category and the same targeted click value. In this example, assume that one bid offers to pay $0.50 per click, while the other bid offers to pay $0.75 per click. Block 506 may include sorting these two bids by bid amount.

Block 508 represents accessing one or more identifiers that indicate which merchant or advertiser submitted various given bids. As detailed further below, the process of selecting ads for presentation can consider which advertiser submitted the ad, as well as considering the history of that advertiser.

Block 510 represents ranking and selecting the received bids for presentation to visitors. The processing represented in some or all of the blocks 502-508 may facilitate ranking and selecting the bids for presentation.

As shown in FIG. 5, the ranking and selection process 510 may include one or more factors, denoted respectively in blocks 512-522, and these blocks 512-522 are detailed further below.

Block 512 represents considering the bid amounts in ranking this bids and selecting the ads for presentation to the visitors. In some instances, the ads may be selected solely based on the bid amounts. In the above example of the $0.50 bid competing with the $0.75 bid, block 512 may include selecting the $0.75 bid and presenting the corresponding ad, based only on the higher bid amount. In other instances, the bid amount is but one factor among many considered in the bid selection process. In these other instances, the lower bid may be selected over the higher bid, after consideration of these other factors.

Block 514 represents considering an advertiser's history in advertising with or through, for example, the website 104. If the advertiser is a long-time customer of the website, then the selection process may consider the length of this relationship when ranking bids.

Block 516 represents considering the overall expected economic value of presenting a given advertisement to a visitor. For example, if a given advertiser has a history of closing lucrative transactions with visitors, then presenting ads from this advertiser may result in higher overall economic value, even if that advertiser offers to pay less on a per-click basis. Additionally, particularly visitors may, over time, demonstrate affinity for particular advertisers or merchants, and may be more likely to purchase from these advertisers.

Block 518 represents considering the percentage of visitors who, when presented with an ad from a given advertiser, actually click or otherwise respond to these ads. This percentage may be expressed as a click-through rate. As noted above, some visitors may favor certain advertisers or merchants, and are more likely to click or otherwise respond to ads from these advertisers or merchants, thereby generating more ad revenue resulting from these clicks. Thus, even if the advertiser pays less per-click, they pay the website more overall because the visitors are more likely to click the ads.

Block 520 represents considering the amount of a typical transaction involving the advertiser. If, for example, the advertiser deals in higher-end goods having a higher cost, this may be a factor in ranking bids for presentation to visitors, particularly visitors who have interest in such goods. More generally, block 520 may include matching the price points of goods or services offered by particular advertisers to the price points sought by particular visitors.

Block 522 represents considering any budgetary factors specified by one or more advertisers. For example, some advertisers may specify a cap for their advertising expenditures over some period of time (e.g., hourly, daily, monthly, etc.). Accordingly, block 522 may include ranking and selecting the bids submitted by such advertisers, so that these advertisers stay within their allotted budgets. More specifically, block 522 may rank and select bids from such advertisers, such that the likely response from visitors enables the advertisers to stay within budget.

Having described the above factors in ranking and selecting the bids for presentation, several observations are now noted. The process flow 500 may be performed as an ongoing process, so as to adjust the selection of ads dynamically as operating conditions change in real time. For example, referring to block 522, if one ad presented by an advertiser proves to be quite popular, and results in a strong response from visitors, this strong response may cause the advertiser to exceed budgetary constraints. In this scenario, the process flow 500 may enable the advertiser to scale back on ad placement, as appropriate to stay within budget.

Referring to block 510, it is noted that in the scenario where two or more bids are competing for the same click values in the same categories, block 510 may include selecting only one bid for placement, at least for some interval of time, in a "winner take all" scenario. In other instances, block 510 may include selecting at least one bid whose ad will be placed more prominently than others, while selecting other bids for placement also, albeit not as prominently. Additionally, as noted above, this placement scenario may be adjusted dynamically as operations proceed and as circumstances change over time.

Figure 6:
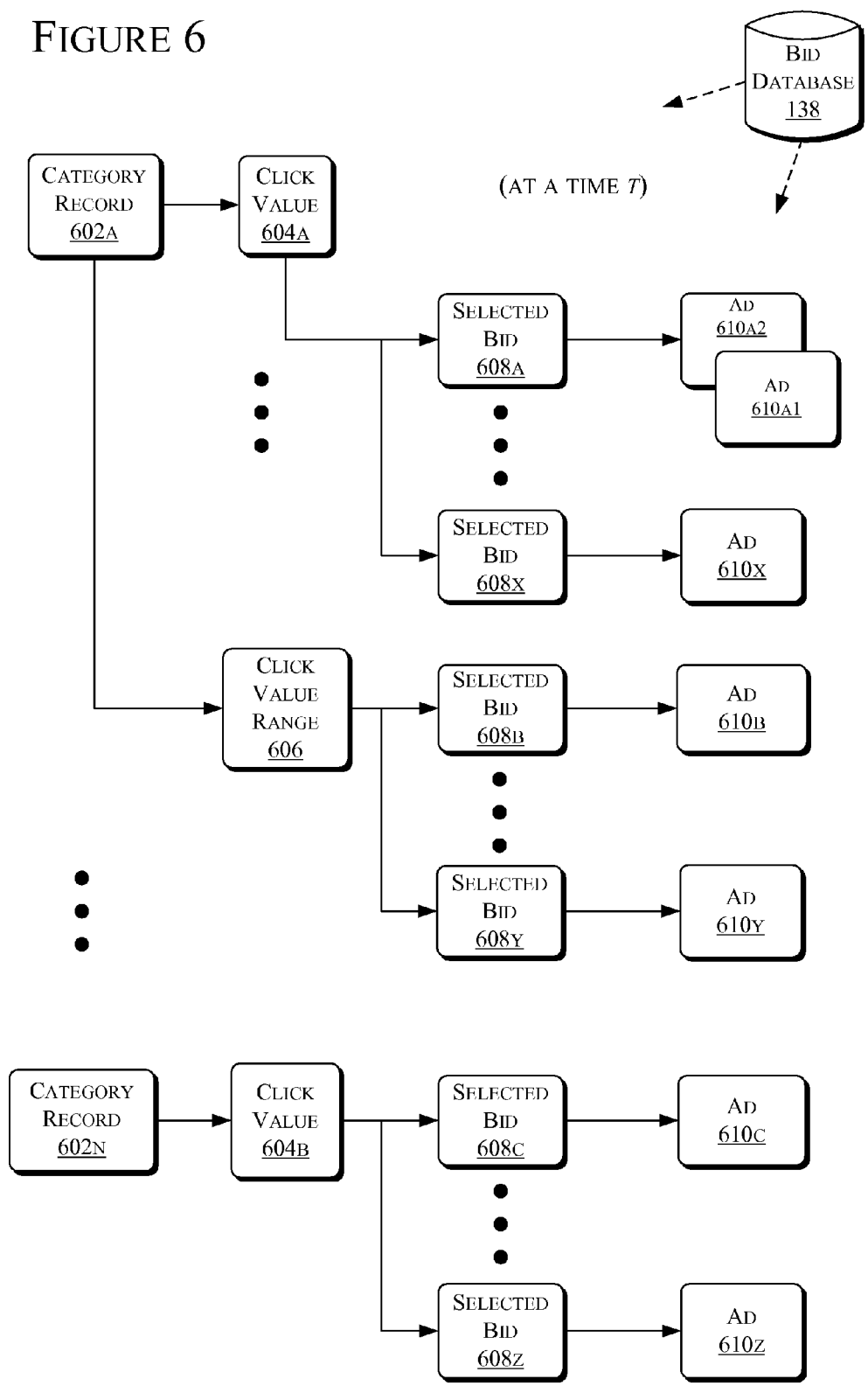
FIG. 6 is a block diagram of the bid value database.

Having described the above process for populating and updating the bid database, the discussion now turns to a description of an illustrative data structure for the bid database, now presented with FIG. 6.

FIG. 6 illustrates, in block form, an illustrative data structure for the bid value database, as it may be populated and updated by the process shown in FIG. 4. Additionally, FIG. 1 shows an example bid value database at 138, and is carried forward to FIG. 6 for convenience only. It is noted that the structure and contents of the bid value database at 138 may change dynamically over time, as operating conditions change. For example, new bids may arrive, advertisers may specify different constraints or budgets, as well as other factors described herein. Thus, FIG. 6 may be considered to illustrate a snapshot of the database 138, taken at an arbitrary time (T).

Turning to the bid value database 138 in more detail, this database may include a category record 602 for the various categories of goods or services offered through, for example, a website. FIG. 6 shows two category records 602A and 602N, but in general, the number of category records is related to the number of categories into which the goods or services are divided. For example, the category record 602A may represent sporting goods offered through the website, while the category record 602N may represent apparel through the website.

Additionally, it is noted that the bid value database could contain records for sub-categories as well. The foregoing description of category records may thus be readily extended to sub-categories.

The bid value database may associate one or more click value fields 604 or click value range fields 606 with the category records 602. FIG. 6 shows a click value field 604A and a click value range field 606 associated with the category record 602A. FIG. 6 also shows one click value field 604N associated with the category record 602N. The click value field 604A may indicate one or more selected bids 608A and 608X, whose ads 610A1, 610A2 (collectively, ads 610A), and 610X are to be presented to visitors having the click value 604A in the category 602A. The click value range fields 606 may indicate a range of click values specified by one or more selected bids 608B and 608Y, whose ads 610A1, 610A2, and 610X are to be presented to visitors having a click value falling in the range 606 in the category 602A. Finally, the click value field 604N indicates one or more selected bids 608C and 608Z, whose ads 610C and 610Z are to be presented to visitors having the click value 604N in the category 602N.

It is noted that the bid database 138 may also implement a "winner take all" scenario as discussed above with FIG. 4, in which only the advertisement for the winning bid is displayed, at least for some interval of time. In this scenario, the bid value database may associate one selected bid amount field 608 with the click value fields 604.

Turning to the relationship between the click value field 604A and the category record 602A, this relationship illustrates a scenario in which two or more advertisements are presented together, albeit in different locations, with higher-ranked advertisements occupying more desirable locations. More specifically, the click value field 604A is shown associated with a plurality of selected bid amount fields 608A through 608X. These winning bid amount fields 608A through 608X may be ranked or ordered in ascending or descending order.

The selected bid fields 608 may be associated with respective advertisement fields 610. These advertisement fields may contain the advertisement to be displayed when a visitor who has the specified click value in the appropriate category or sub-category hits the website. FIG. 6 shows the advertisement fields 610A, 610B, 610C respectively associated with the selected bid fields 608A, 608B, and 608C, and the advertisement fields 610X, 610Y, and 610Z respectively associated with the selected bid fields 608X, 608Y, and 608Z. Turning to the ad fields 610A1 and 610A2 in more detail, these two blocks represent a scenario in which a selected bid (e.g., 608A) is associated with two selected advertisements, with one advertisement (e.g., 610A1) being selected for presentation in a more prominent position than the other advertisement (e.g., 610A2).

Having described the advertiser bid database 138 in FIG. 6, the discussion proceeds to a description of an operating environment similar to that shown in FIG. 1, as it may function when interacting with a visitor to the website. This description is now presented with FIG. 7.

Figure 7:
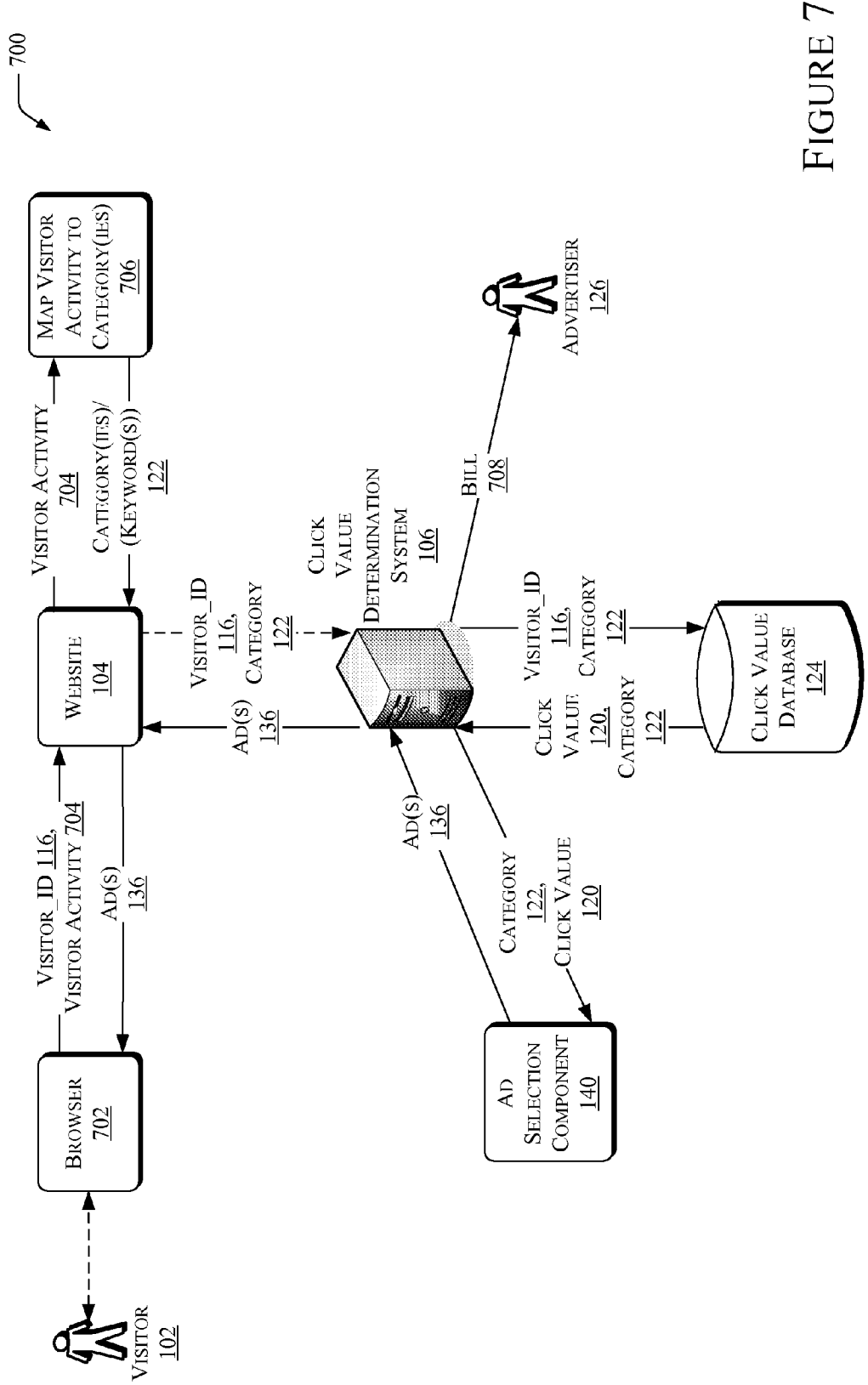
FIG. 7 is a combined block and data flow diagram of the operating environment shown in FIG. 1, as it may function when interacting with one of the visitors to the website.

FIG. 7 illustrates the operating environment as shown in FIG. 1, as it may function when interacting with one of the visitors to the website. Elements that have been described previously are carried forward for convenience only, and denoted by the same reference numbers.

As shown in FIG. 7, a given visitor 102 may interact with the website 104 using, for example, a browser application 602. The website may receive an indication of visitor activity 704, which may include, for example only, one or more keywords entered by the visitor as part of a search, for instance. These keywords may relate to one or more items of interest to the visitor. The indication of visitor activity 704 may also include information representing the visitor's past browsing behavior, transaction history, or the like.

In some instances, the visitor may also log in to an account established with the website. As part of that log-in process, the browser may send an identifier, such as the visitor identifier 116 described previously, to the website. In other instances, the website may identify or track the visitor using cookies or other similar mechanisms.

The website 104 may receive the visitor activity 704 and the visitor identifier 116, and forward the visitor identifier to, for example, the click value server 106. In some implementations, the website may route the visitor activity 604 as received from the visitor to a process 706 that maps the input visitor activity to a corresponding category or sub-category of goods or services. Examples of such categories or sub-categories are shown at 122 in FIG. 1.

As detailed further below, these implementations may present ads (e.g., 136) to the visitor that relate to the subject matter of the visitor activity. For example, if visitor activity includes the visitor providing the keyword "golf club", then the mapping process 706 may map this keyword to a sporting equipment category, or to a golfing sub-category, and the website may route the visitor identifier and the category to the click value server. In these implementations, any ads presented to the visitor may pertain or relate to the keyword provided by the visitor (e.g., sporting goods or golfing equipment). Put differently, in these implementations, the website may specify the category to which the ads are to relate.

In some instances, the mapping process 706 may infer a keyword of interest to the visitor, based on the visitor activity. For example, the visitor may do a keyword search for books related to software, but may research or seek reviews about particular books relating to decision trees. In such instances, the mapping process 706 may infer that the visitor is interested in the sub-category of decision trees, and may pass this information along in keyword form, along with one or more categories 122.

In other implementations, the keyword provided by the visitor may not play as prominent a role in selecting the ad or ads presented to the visitor. In these implementations, the website may forward the visitor identifier 116, but not the category 122, to the click value server. As detailed further below, in these implementations, the ads presented to the visitor may not relate to the keyword provided by the visitor. Put differently, in these implementations, the website does not specify the category to which the ads are to relate, leaving the selection of ads as a more open-ended process.

The click value server 106 may receive at least the visitor identifier 116, and may query the click value database 124, using at least this visitor identifier as a search key. Recall that the click value database may be structured as shown in FIG. 3, such that the click value database may locate any visitor records 302 that match the input visitor identifier. In turn, the click value database may return any category records (e.g., 304) and related click value fields (e.g., 308) that relate to the visitor 102. FIG. 7 shows the contents of these category records and click value fields as category values 122 and click values 120.

In implementations where the website forwards the category to the click value server, the click value server 106 may pass the category value 122 to the click value database as a search key, in addition to the visitor identifier. In these implementations, the click value database may search not only for visitor records 302 that match the input visitor identifier, but also for those visitor records that specify click values for the input category 122. Here, the click value database may return the click values (e.g., 120) for only the input category (e.g., 122).

In any event, the click value server may interact with the advertisement selection component 140, which may receive as input one or more categories and corresponding click values as associated with the visitor 102. Recall that FIG. 6 provides an illustrative structure for the advertiser bid database. Using this structure only as an example, the advertisement selection component may search the category records 602 for any that match the input category value 122. Within any matching records, the advertisement selection component may search for any click value fields or click value ranges 606 that match or exceed the input click value 120. If any click values or click value ranges match or satisfy the input click value, then the advertisement selection component may retrieve any advertisements (e.g., from the fields 610) that correspond to these matching click values or click value ranges. In this manner, the advertisement selection component may return any ads 136 that are to be presented to visitors whose click values in the specified categories match or exceed the specifications of the advertisers 126. It is noted that the advertisement selection component may return one or more ads 136, depending on how many matches or hits occur for the input categories and click values.

Having received the ads from the advertisement selection component, the click value server may forward these ads to the website 104 for presentation to the visitor 102. The website may push these ads to, for example, the visitor's browser 702, as shown in FIG. 7. In addition, the click value server or, more generally, the website may bill the advertiser 126 who provided the selected advertisement. This billing process is denoted generally at 708. It is noted that the billing process may occur when the ad is pushed to the visitor, when or if the visitor clicks on the ad or otherwise responds to the ad, or at any other convenient time.

Figure 8:
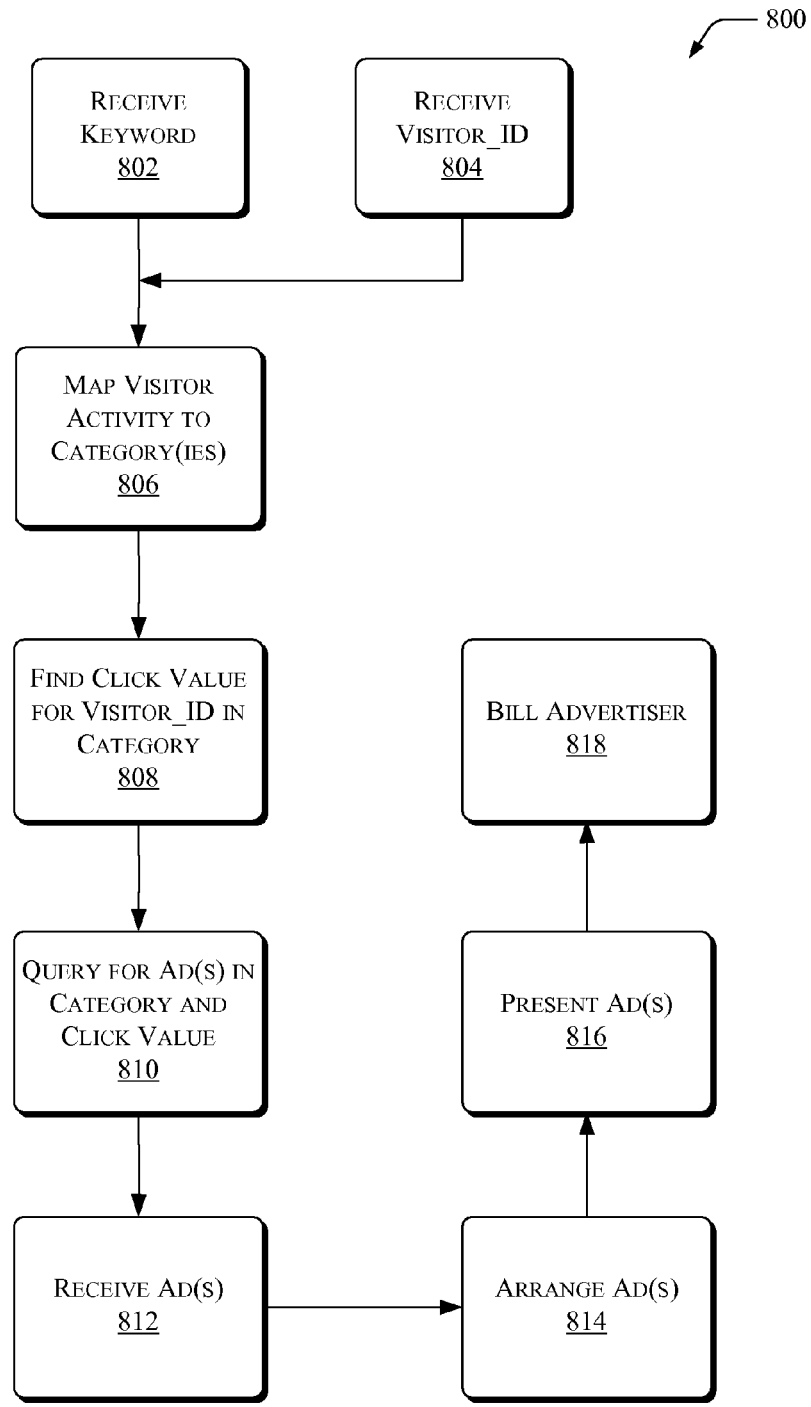
FIG. 8 is a flow diagram of a process for managing click values associated with visitors to web sites.

Having described the operating environment 700 in FIG. 7, the discussion proceeds to a more detailed description a process for managing click values associated with visitors to web sites, now presented with FIG. 8.

FIG. 8 illustrates a process flow 800 for managing click values associated with visitors to web sites. While the process flow 800 is described with reference to the click value server and website shown in FIG. 7, it is understood that aspects of the process flow 800 may be performed with other operating environments without departing from the spirit and scope of the description herein.

Block 802 represents receiving one or more keywords from a visitor to a website. For example, the visitor 102 as shown in FIG. 7 may conduct a search to identify products of interest, perform research, investigate merchants, or the like. FIG. 7 shows an example of keywords at 704.

Block 804 represents receiving an identifier associated with the visitor to the website. FIGS. 1 and 7 show an example identifier at 116. It is noted that blocks 802 and 804 may be performed in any order relative to one another.

Block 806 represents mapping the keyword received in block 802 to one or more categories or sub-categories corresponding to goods or services offered through the website. For example, if the input keywords are "golf clubs", then block 806 might map these keywords to a sporting goods category, or to a golfing equipment sub-category.

Block 808 represents finding the visitor's click value. In different implementations, block 808 may include finding the visitor's click value only for the category defined in block 806, or may include finding the visitor's click values in a plurality of different categories. These different approaches were described above in FIG. 7. Block 808 may include accessing a data store, such as, for example, the click value database 124 shown in FIG. 7.

Block 810 represents querying for any advertisements that match or satisfy the visitor's click value. As described above, in some implementations, this query may cover one category, such as a category that corresponds to the keyword received in block 802 (e.g., 704). In other implementations, this query may cover any category for which records exist in the data store (e.g., the click value database 124 or the advertiser bid database 138).

Block 812 represents receiving one or more advertisements that match or satisfy the visitor's click value. For example, FIG. 6 shows advertisement fields 610 that may contain advertisements (e.g., 136 in FIG. 1). If the visitor's click value matches or exceeds one or more click values as specified by the advertisers (e.g., click value fields 604), then the corresponding advertisements may be retrieved from the fields 610.

In implementations where the search for click values is limited to the one category to which the keyword was mapped, the advertisements may be closely related to the keywords provided by the visitor. In implementations where the search for click values is not limited to the one category to which the keyword was mapped, the advertisements may involve goods or services that are not closely related to the keywords provided by the visitor. For example, assume that the visitor enters the keywords "golf clubs", but that the visitor does not have a high click value in the sporting goods category. In this example, the visitor's click value in sporting goods may not qualify to receive some advertisements relating to golf. However, if the visitor has a high click value in apparel, the visitor may receive advertisements relating to apparel, even though the original keyword search pertained to golf clubs.

Block 814 represents arranging the advertisements for presentation to the visitor. Recall from FIG. 6 that within a given category, the advertisement selection component 140 may implement a "winner takes all" scenario, with the best bid for a given click value eliminating all previous bids. Alternatively, the advertisement selection component 140 may implement a scenario in which multiple bid "win", but are nevertheless ranked or sorted by bid value, with the highest bids having their advertisements presented in the more desirable locations. Block 814 may include arranging, for example, HTML code for the advertisements so that the higher-ranked advertisements are placed more prominently than lower-ranked advertisements.

Block 816 represents presenting the advertisements to the visitor. The advertisements may be presented as pop-up windows, clickable boxes or links appearing within a given window with other content (e.g., search results), scrolling banners, or the like.

Block 818 represents billing or invoicing the advertisers whose ads are presented to the visitors. These billing events may be triggered when the ads are presented, and/or when the visitors click or otherwise interact with the ads, or at any other convenient time.

Figure 9:
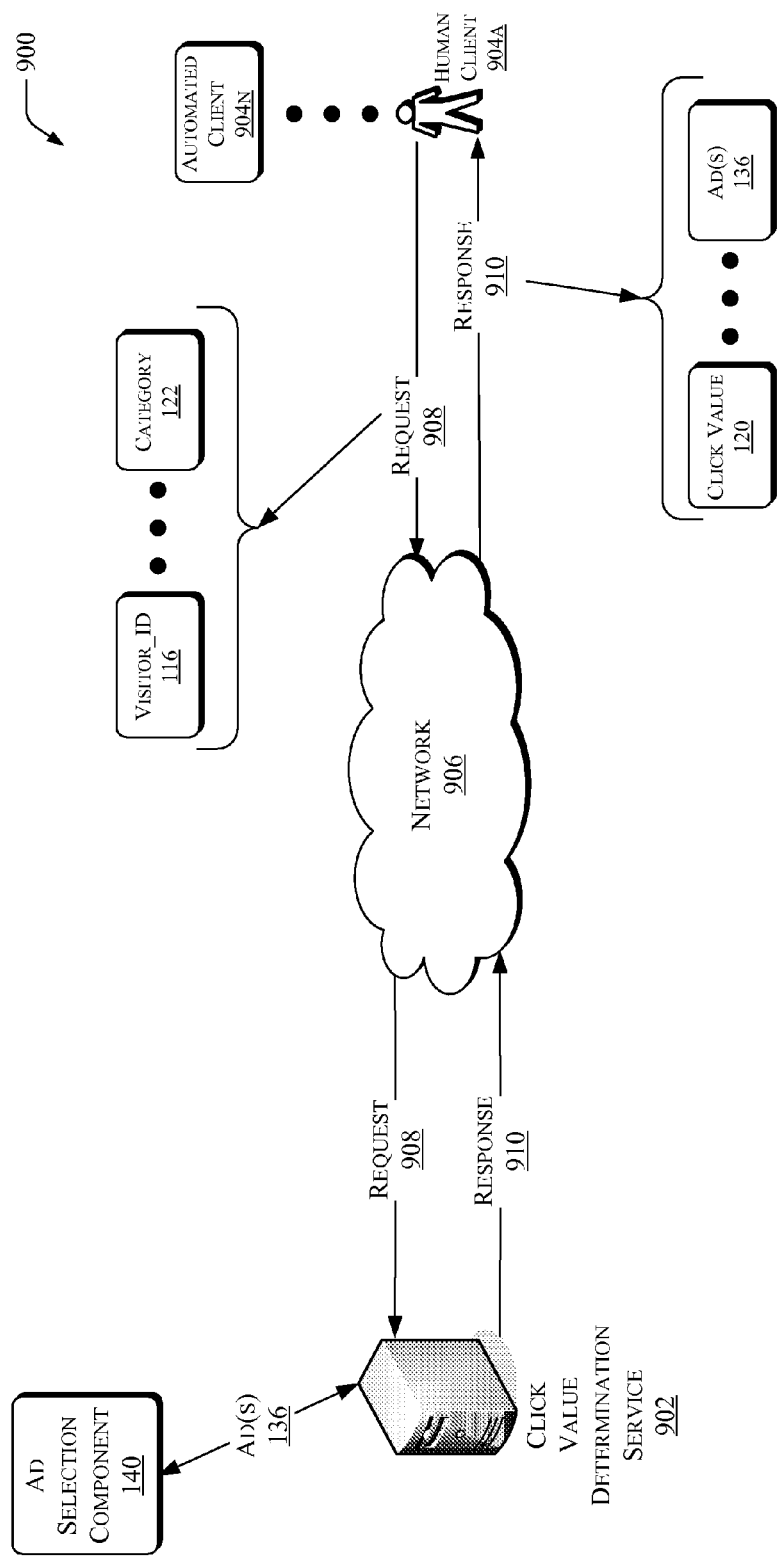
FIG. 9 is a block diagram of an operating environment for providing click value determination services to third parties, for example, as a web service.

Having described the process flow 800 in FIG. 8, the discussion proceeds to a description of an operating environment for providing click value determination services to one or more third parties via a web service, now presented with FIG. 9.

FIG. 9 illustrates an operating environment 900, in which a click value determination service 902 may perform various services for one or more clients 904. As shown in FIG. 9, the clients 904 may include a human client 904A, and/or an automated client 904N, which may be, for example, an executing software process. The clients 904 and the click value determination service 902 may communicate over a network 906, which may be any suitable local area or wide area communications network.

The click value determination service 902 may be implemented as described above to perform any of the functions shown in connection with FIGS. 1-8. The click value determination service may perform any of these functions on behalf of the clients 904, which may be remote from the click value determination service. For example, the clients 904 may submit one or more requests 908 that the click value determination service compute click values for the client. These click value requests may include one or more visitor_IDs, which FIG. 9 denotes for convenience but not limitation at 116.

In some instances, these requests 908 may also include one or more categories or sub-categories for which the click value service is to compute click values. These categories or sub-categories are denoted, for convenience only, at 122. In other instances, the click value service may compute click values for all supported categories or sub-categories. In such instances, the requests 908 may not specify a category 122.

FIG. 9 denotes the responses from the click value service 902 generally at 910. The responses 910 may include one or more click values computed in response to the request 908, denoted, for convenience only, at 120. In some instances, the responses 910 may also include one or more ads for presentation to visitors to, for example, web sites operated by the clients 904. For convenience only, FIG. 9 denotes these ads at 136. These ads may be selected and returned by the ad selection component 140, for example.

The click value service 902 may compute the click values for the clients 904 based on information stored and maintained by the click value service itself. In some instances, the information for computing the clients may be housed at the clients 904. In other instances, the requests 908 from the clients may include the information appropriate for computing the click values.

Figure 10:
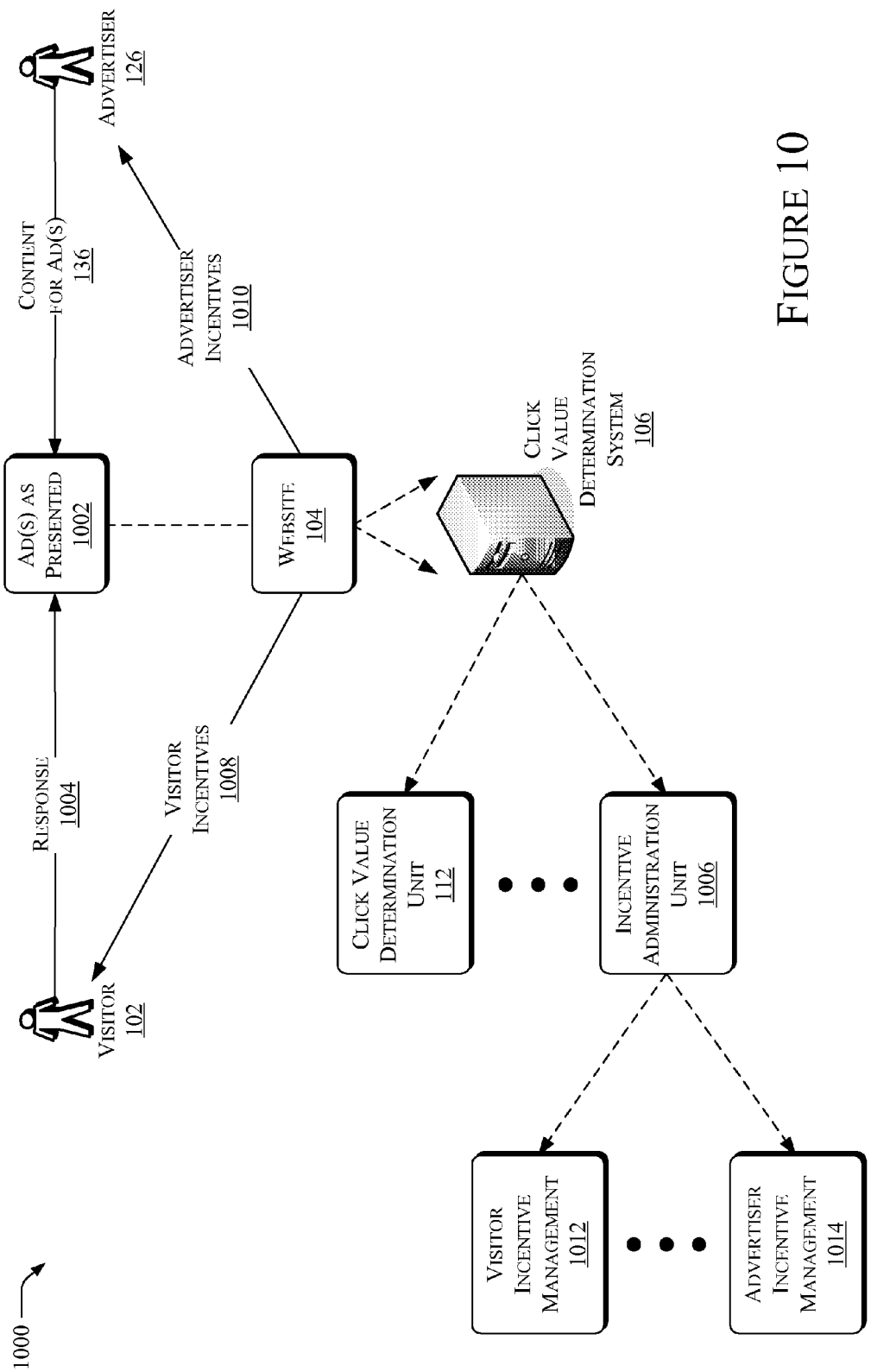
FIG. 10 is a block diagram of an operating environment for providing incentives to the visitors to the website and to advertisers who provide advertising content for presentation to the visitors and provide feedback regarding visitors to the website.

Having described the operating environment 900 in FIG. 9, the discussion proceeds to a description of an operating environment for providing incentives to the visitors and to the advertisers, now presented with FIG. 10.

FIG. 10 illustrates an operating environment 1000 for providing incentives to the visitors 102 and to the advertisers 126. FIG. 10 shows one visitor 102 and one advertiser 126 for convenience only, but the operating environment 1000 may provide incentives to any number of visitors and advertisers.

Elements and components described above are carried forward into FIG. 10 for convenience only, and are denoted by the same reference numbers. Thus, the visitor 102 may interact with the website 104. The website may receive advertising content 136 from the advertisers, and present these ads to the visitors, as denoted generally at 1002. The visitors may respond to these ads by clicking or otherwise interacting with the ads, as denoted generally at 1004. It is noted that the term "click" is used herein only for convenience, but not limitation. The response 1004 may take any appropriate, including clicks on any type of user interface, voice response, or the like.

As described above, the website 104 may include the click value server 106, which in turn may include the click value determination unit 112 and an incentive administration unit 1006. The incentive administration unit generally operates to manage and distribute incentives provided to the visitors, denoted generally at 1008, and incentives provided to the advertisers, denoted generally at 1010.

To perform these functions, the incentive administration unit may include a visitor incentive management unit 1012 and an advertiser incentive management unit 1014. For example, the visitor incentives 1008 may take the form of refunds, discounts, credits, or other forms of value received by the visitor for use in connection with purchases conducted through the website 104, or with third parties associated with the website. Similarly, the advertiser incentives 1010 may take the form of refunds, discounts, credits, or other forms of value received by the advertisers for use in connection with any fees or charges billed to the advertisers by the website.

Figure 11:
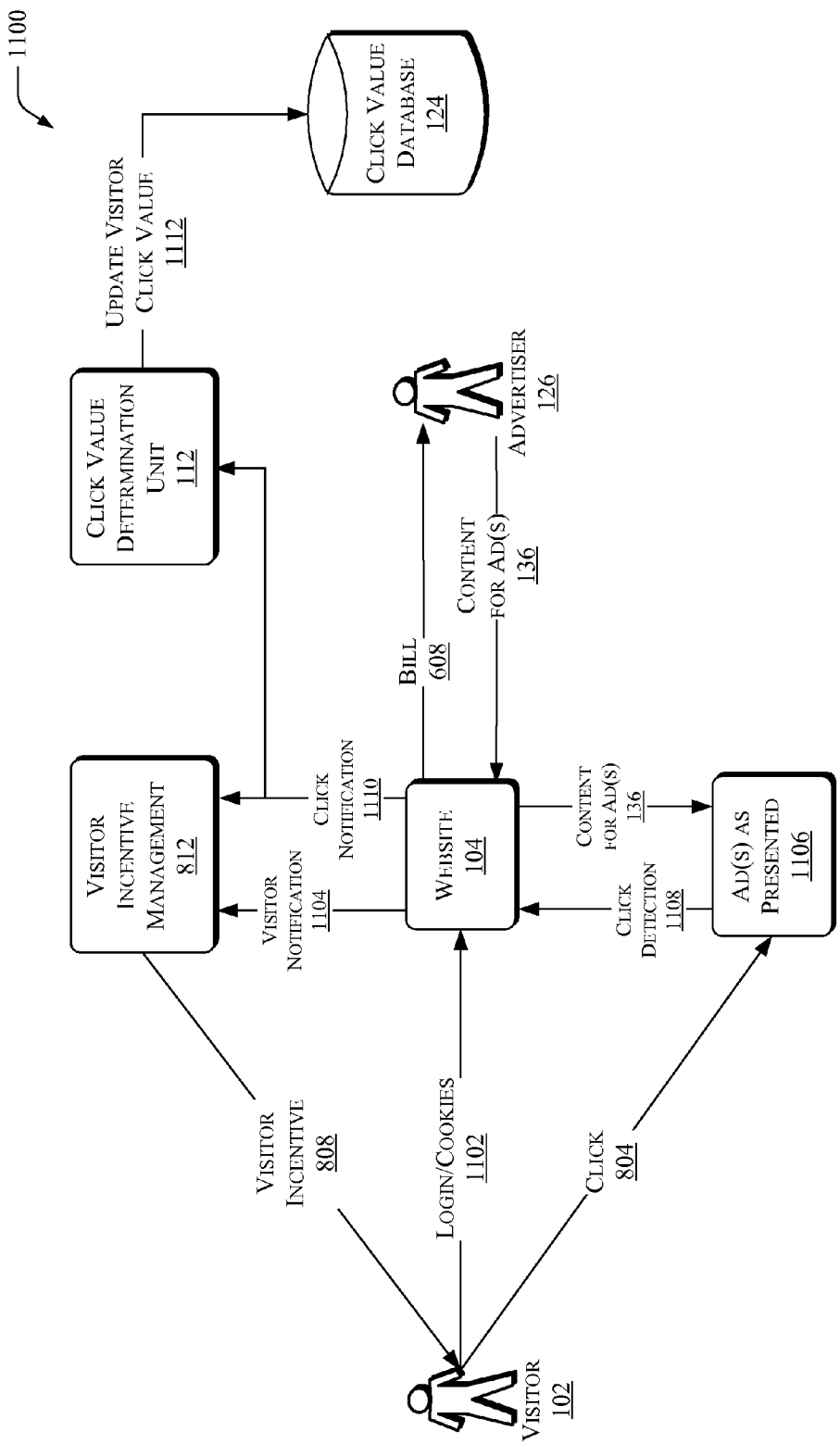
FIG. 11 is a block diagram of the operating environment as shown in FIG. 10, as it may function to provide incentives to the visitors.
Figure 12:
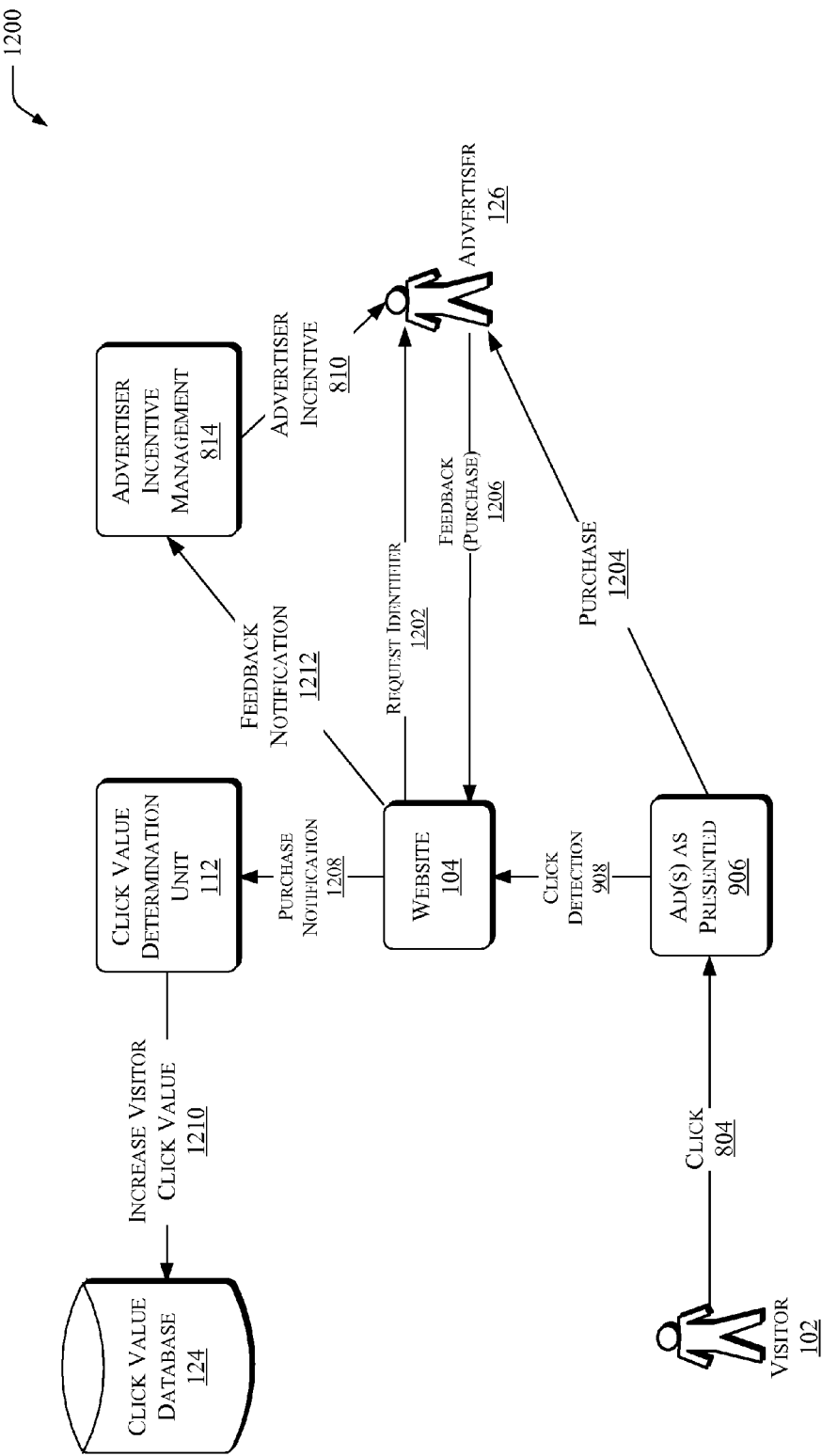
FIG. 12 is a block diagram of the operating environment as shown in FIG. 11, as it may function to provide incentives to the advertisers.
Figure 13:
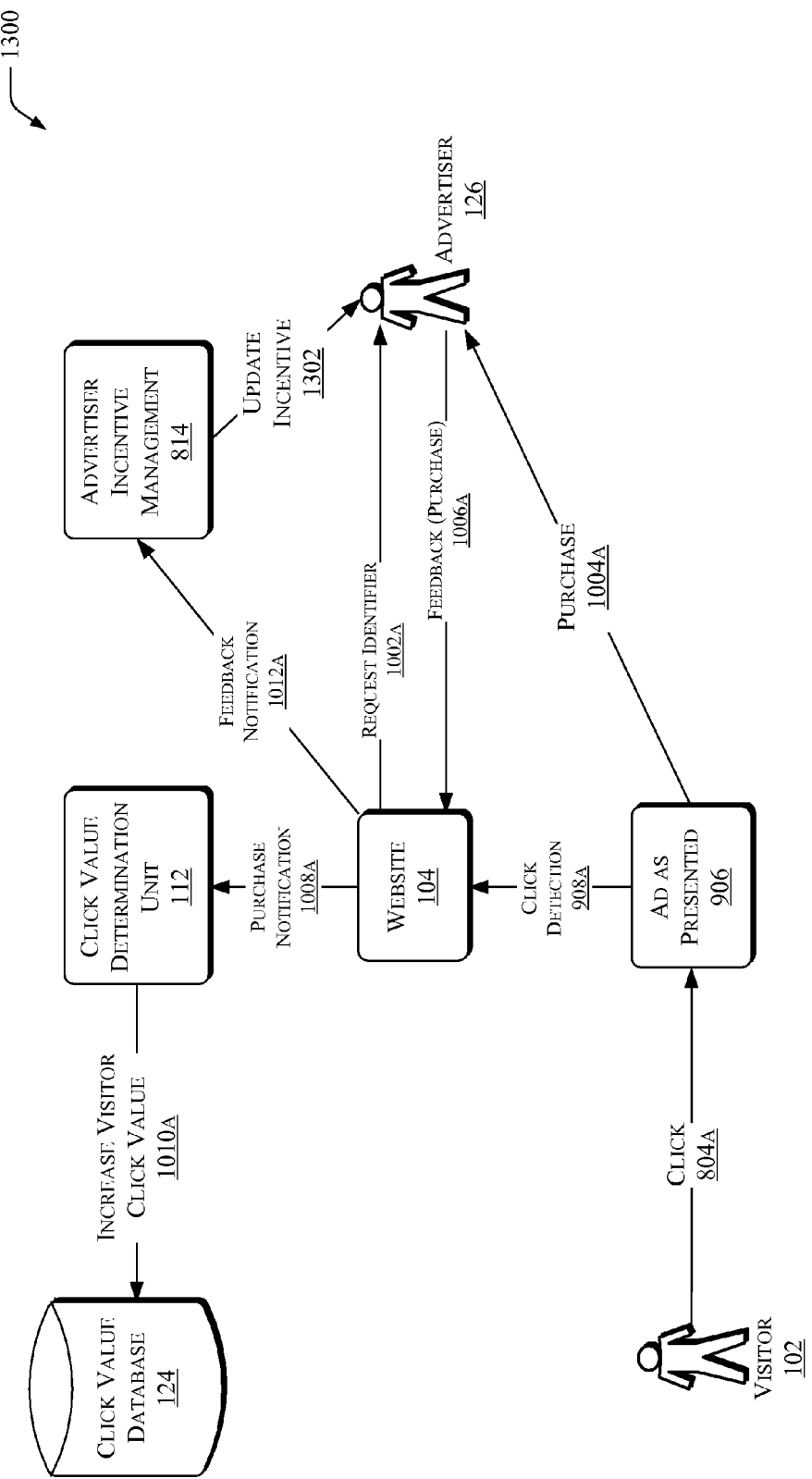
FIG. 13 is a block diagram of the operating environment as shown in FIG. 12, as it may function to alter subsequent incentives provided to the advertisers.

FIG. 11 provides more details relating to the visitor incentive management unit, while FIGS. 12 and 13 provide more details relating to the advertiser incentive management unit. Having described the operating environment 1000 in FIG. 10, the discussion proceeds to a more detailed description an operating environment for providing incentives 1008 to the visitors 102, now provided with FIG. 11.

FIG. 11 illustrates an operating environment 1100 similar to that as shown in FIG. 10, but providing further detail on how the operating environment may function to provide incentives to the visitors, along with related data flows amount the visitors, the website, and the advertisers. To motivate the visitors to establish accounts with the website, and to login to those accounts, the website may provide a portion of advertisement-related revenues to the visitors, denoted generally at 1008. In some instance, the visitors may log-in to the website, thereby identifying themselves to the website. In other instances, the website may identify or track the visitor using cookies or other similar mechanisms. These scenarios are denoted generally at 1102. In any event, having identified the visitor the website may send a visitor notification 1104 to the visitor incentive management module 1012. In response to this notification, the visitor incentive management module may begin tracking how much advertisement revenue accrues to the website as a result of the visitor's activity.

Once the visitor has logged in and has begun interacting with the website, one or more advertisements 1106 may be pushed to the visitor. The visitor may respond to these ads by clicking or other appropriate actions, denoted generally at 1004. The website may detect these clicks or other responses, as denoted at 1108. The website may forward a click notification 1110 to the visitor incentive management module and to the click value determination unit. Additionally, assuming that the visitor's response to the advertisement 1106 results in advertisement revenue to the website, the website may generate a billing event, denoted generally at 608.

Turning to the click notification in more detail, the visitor incentive management module may respond to the click notification to aggregate the amounts of any revenue attributable to the visitor's actions or responses to advertisements. For example, if the visitor clicks the ad 1106, and the website charges the advertiser $0.50 per click, then the visitor incentive management module tracks the $0.50 in revenue that the visitor's click generated on behalf of the website. The visitor incentive management module may compute the visitor incentive 1008 as some portion of the aggregated revenue attributable to the visitor's actions. For example, the visitor incentive management module may multiply the aggregated revenue by some percentage to compute the visitor incentive.

To deter visitors from committing fraud or misuse by repeatedly clicking on the ads, the click value determination unit 112 may respond to the click notification by reducing the visitor's click value, as stored in the click value database 124. For example, if a visitor clicks once on two ads, the visitor's click value may be reduced by some amount. The amount of this reduction may depend on the visitor's original click value, time durations between clicks, the number of clicks that the visitor has performed over some previous time interval, or other similar factors. Additionally, the visitor's click value may be reduced if he or she clicks an ad without making a purchase through the ad.

FIG. 11 denotes updating the visitor's click value generally at 1112. As detailed further in FIG. 12, the visitor may increase his or her click value by making purchases from the website, or from an advertiser or other third party associated with the website.

It is noted that the visitor may have some level of interest in maintaining a high click value, at least in some categories. The higher the visitor's click value is, the more likely that the advertisers may pay a premium to attract clicks from the visitor. Accordingly, if the visitor is receiving, as an incentive, a percentage of the revenue resulting from his or her clicks, then the visitor may ultimately increase his or her incentives by maintaining a high click value.

Having described the visitor incentive scheme in FIG. 11, the discussion now turns to additional details related to the visitor incentives, as well as a description of advertiser incentives, now presented with FIG. 12.

FIG. 12 illustrates an operating environment 1200 similar to that shown in FIG. 10, but providing further details in how the operating environment may function to provide incentives to the advertisers. Some elements are carried forward from previous drawings for convenience only, and are denoted by identical reference numerals.

As described in FIG. 11, the visitor may click or otherwise response to the ads 1106, as denoted generally at 1004. The website may detect these clicks, as denoted at 1108. In response to detecting a given click from the visitor, the website may associate a unique request for feedback with the click, denoted at 1202, and may forward this identifier to the advertiser. The request 1202 may be assigned a unique number or other identifier, so as to relate the request to a particular click.

The visitor's click on the ad may result in a purchase or other consummated transaction, as generally denoted at 1204. The advertiser may report this purchase or other consummated transaction via feedback 1206. This feedback from the advertiser may reference the unique request 1202, such that the website may readily correlate a given request to any subsequent purchase feedback that results from that request.

When the website receives an instance of feedback 1206, indicating that the visitor has made a purchase, the website may generate a purchase notification 1208, and provide it to the click value determination unit 112. In response, the click value determination unit may increase the visitor's click value, as denoted generally at 1210, by updating the visitor's record or records in the click value database 124.

Turning to the advertisers, when the website receives the feedback 1206, it may provide a feedback notification 1212 to the advertiser incentive management module 1014. In response to receiving the feedback notification, the advertiser incentive management module may provide the advertiser incentive 1010 to the advertiser. One possible example of an advertiser incentive is a discount or rebate on advertising fees charged by the website to the advertiser. However, in some instances, unscrupulous advertisers may misuse the incentive system shown in FIG. 12 by falsely reporting purchases 1204 through the feedback mechanism 1206. The discussion now proceeds to FIG. 13, which presents an operating environment for addressing this possibility.

FIG. 13 illustrates an operating environment 1300 similar to that as shown in FIG. 12, but providing additional details related to altering subsequent incentives provided to the advertisers. For convenience only, some elements are carried forward from previous drawings, and denoted by identical reference numerals. Assume, for example, that the operating environment 1200 shown in FIG. 12 represents a first purchase made by the visitor and reported by the advertiser. FIG. 13 shows an operating environment as adapted for handling subsequent purchases reported by the advertiser.

The visitor 102 may click the ad 1106 a second time, as represented by the click 1004A. In another example, the visitor may click on a second ad presented by the same advertiser. In any event, the website 104 may detect this second or subsequent click, as denoted at 1108A. In response to detecting the click, the website may generate a second request 1202A, and provide it to the advertiser. The visitor may conduct a second purchase, denoted at 1204A, with the advertiser 126. The advertiser may report this purchase to the website as feedback 1206A. In turn, the website may generate a second purchase notification 1208A, and provide it to the click value determination unit. In turn, the click value determination unit may increase the visitor's click value in response to this second purchase, as denoted at 1210A.

Also in response to the purchase feedback 1206A, the website may generate a second feedback notification, denoted at 1212A, and forward it to the advertiser incentive management module 1014. However, because the feedback notification 1212A is a second feedback notification involving the same advertiser, the advertiser incentive management module may provide an updated advertiser incentive 1302 to the advertiser. For example, the updated advertiser incentive 1302 may be smaller than the advertiser incentive 1010 shown in FIG. 12. In addition, if the advertiser reports any subsequent purchases, then the advertiser incentives 1302 provided to the advertiser may be reduced by a small amount each time.

In the foregoing manner, if the advertiser seeks to inflate its advertiser incentives by falsely reporting purchases resulting from clicks, then the operating environment 1300 may gradually diminish the returns gained by the advertiser through such false reporting. Eventually, the incentive or gain for the advertiser to falsely report purchases may decrease enough to deter this false reporting.

Generally, the more that a given advertiser pays the website for advertisements, the more the website may increase the incentives paid to the advertiser. Put differently, the incentives paid to the advertiser may be proportional to, and some percentage of, the revenue received from the advertiser. It is noted, however, that the incentives paid to a given advertiser would typically not meet or exceed the revenue received from the advertiser.

Generally, the advertiser may have some level of interest in not falsely reporting purchases back to the website. For example, were the advertiser to falsely report that a given visitor purchases, the website may increase the click value of the visitor. If the advertiser wishes to target only well-qualified visitors, this false reporting may undermine the advertiser's goals, resulting in the advertiser paying for less-qualified visitors to receive ads.

Generally, the advertiser incentive management module may determine a given advertiser's incentive over time by comparing the number of visitors that are directed to ads placed by the advertiser to the number of purchases reported by the advertiser. As the number of reported purchases approaches the number of visitors referred to the advertiser, the amount of the advertiser's incentive may approach zero.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of using click values associated with visitors to monetize advertising using a website, the method comprising:
   defining a plurality of different categories;
   computing respective click values associated with different ones of the visitors based at least in part on interaction by the visitors with goods or services categorized within the plurality of different categories, wherein the click values indicate respective perceived business values of the visitors in the plurality of different categories, wherein the computing the respective click values includes:
      tracking individual instances of interaction between the visitors and goods or services categorized within the plurality of different categories;
      determining fundamental click values associated with each of the individual instances; and
      aggregating the fundamental click values for individual ones of the visitors and the plurality of different categories to compute the respective click values associated with different ones of the visitors;
   assigning the click values to respective visitor identifiers of the visitors in the plurality of different categories;
   receiving a bid amount as an amount of money an advertiser is willing to pay to have an advertisement presented to one of the visitors having a respective click value in one of the plurality of different categories;
   selecting, from a plurality of advertisements, at least one advertisement having a click value that is less than or equal to the respective click value of the one of the visitors; and
   designating a placement from a plurality of locations for the at least one advertisement for presentation to the one of the visitors based at least in part on the bid amount associated with the at least one advertisement.

2. The method of claim 1, wherein defining the plurality of different categories includes defining categories based on goods or services offered by the website.

3. The method of claim 1, wherein defining the plurality of different categories includes defining categories based on goods or services offered by at least one advertiser on the website.

4. The method of claim 1, wherein computing respective click values includes:
   dividing a plurality of transaction history records related to transactions conducted between a plurality of visitors and at least one web site into the plurality of different categories; and
   processing the plurality of transaction history records to determine the perceived business values of the visitors in the plurality of different categories.

5. The method of claim 1, further comprising transmitting the at least one advertisement to the one of the visitors.

6. The method of claim 4, further comprising associating respective transactions with at least one of the plurality of different categories that include defined categories based on goods or services.

7. The method of claim 6, wherein computing click values includes associating click values with the at least one of the plurality of different categories.

8. The method of claim 6, further comprising associating ones of the transactions with respective sub-categories of goods or services.

9. The method of claim 8, further comprising associating the click values with the sub-categories.

10. The method of claim 5, wherein the processing the plurality of transaction history records includes identifying purchase transactions effected by the ones of the visitors.

11. The method of claim 5, wherein the processing the plurality of transaction history records includes identifying respective subject matter involved with the transactions.

12. The method of claim 1, further comprising storing to a click value database the click values, the respective visitor identifiers, and the plurality of different categories.

13. At least one click value server for determining click values associated with visitors to a website, for performing the method of claim 1.

14. A web service providing click value determination services to a plurality of clients, performing the method of claim 1.

15. The method of claim 1, wherein the selecting includes two or more advertisements, and wherein the designating a placement is performed for the two or more advertisements for presentation based at least in part on the bid amount associated with each of the two or more advertisements.

16. The method of claim 1, wherein the selecting from a plurality of advertisements the at least one advertisement results in a selection of advertisements that are different for a first visitor and a second visitor, the first visitor and the second visitor having different respective click values.

17. A method comprising:
   receiving a plurality of indications of visitor activity with goods, services, or both, the plurality of indications of visitor activity associated with individual ones of visitors to an electronic marketplace;
   determining fundamental click values associated with each of the plurality of indications of visitor activity;
   aggregating the fundamental click values for the individual ones of the visitors to determine click values associated with the individual ones of the visitors;
   storing the click values determined for a visitor in association with a visitor identifier for the visitor, wherein the click value indicates a perceived business value associated with the visitor;
   determining a click value associated with the visitor based at least on a visitor identifier associated with the visitor;
   querying for at least one advertisement to present to the visitor based at least on the click value, the advertisement selected from a plurality of advertisements having respective bid values that include at least a bid click value and a bid amount as compensation for placement of the advertisement; and selecting, for presentation to the visitor, at least one of the plurality of advertisements that includes a bid click value that is less than or equal to the click value associated with the visitor.

18. The method of claim 17, wherein the goods, services, or both are categorized into a plurality of different categories, and wherein the aggregating the fundamental click values for the individual ones of the visitors includes aggregating the fundamental click values based on the plurality of different categories.

19. The method of claim 17, wherein the receiving the plurality of indications of visitor activity includes receiving indications of browsing history associated with the plurality of visitors.

20. The method of claim 18, wherein the selecting at least one of the plurality of advertisements further includes querying for the advertisement based on at least one of the different categories in addition to the bid click value.

21. The method of claim 17, further comprising receiving at least one advertisement corresponding to at least one selected bid that specified at least the click value associated with the visitor.

22. The method of claim 18, further comprising receiving at least one advertisement corresponding to at least one selected bid that specified at least the click value and the category associated with the visitor.

23. The method of claim 17, further comprising receiving at least two advertisements that correspond to respective selected bids that specified at least the click value associated with the visitor.

24. The method of claim 18, further comprising:
receiving a selection of the at least one of the plurality of advertisements by the user;
generating a request for feedback from the visitor and for an advertiser of the advertisement responsive to the receiving the selection; and
sending the request for feedback to the advertiser.

* * * * *